US012643411B2

(12) United States Patent
Ozawa et al.

(10) Patent No.: US 12,643,411 B2
(45) Date of Patent: Jun. 2, 2026

(54) SYSTEMS AND METHODS FOR TOWING ELECTRIC VEHICLES

(71) Applicant: Adeia Guides Inc., San Jose, CA (US)

(72) Inventors: Toshiro Ozawa, Irvine, CA (US); Ning Xu, Irvine, CA (US)

(73) Assignee: Adeia Guides Inc., San Jose, CA (US)

( * ) Notice: Subject to any disclaimer, the term of this patent is extended or adjusted under 35 U.S.C. 154(b) by 104 days.

(21) Appl. No.: 18/375,335

(22) Filed: Sep. 29, 2023

(65) Prior Publication Data

US 2025/0108696 A1     Apr. 3, 2025

(51) Int. Cl.
B60L 7/18     (2006.01)
B60L 15/20     (2006.01)

(52) U.S. Cl.
CPC ................ B60L 7/18 (2013.01); B60L 15/20 (2013.01); *B60L 2200/28* (2013.01); *B60L 2240/12* (2013.01); *B60L 2240/423* (2013.01)

(58) Field of Classification Search
None
See application file for complete search history.

(56) References Cited

U.S. PATENT DOCUMENTS

| | | | | |
|---|---|---|---|---|
| 8,700,284 | B2 * | 4/2014 | Wojtkowicz | B60L 7/18 903/907 |
| 11,007,894 | B2 * | 5/2021 | Zenner | B60T 8/323 |
| 11,685,265 | B2 * | 6/2023 | Deaton | B60K 7/0007 701/22 |
| 11,904,702 | B2 * | 2/2024 | Flaum | B60L 15/38 |
| 12,103,433 | B2 * | 10/2024 | Madineni | B60Q 1/44 |
| 12,252,039 | B2 * | 3/2025 | Treharne | B60L 50/60 |
| 2021/0197673 | A1 | 7/2021 | Espig et al. | |
| 2022/0388484 | A1 | 12/2022 | Salter et al. | |
| 2022/0410872 | A1 | 12/2022 | Salter et al. | |
| 2024/0149863 | A1 * | 5/2024 | Shin | B60L 7/18 |

FOREIGN PATENT DOCUMENTS

DE     102020205026 A1     10/2021

OTHER PUBLICATIONS

Tesla's 2019 Model 3 owner's manual. Published Dec. 20, 2018 https://tesla-info.com/doc/m3/model_3_owners_manual_north_america_en_2019_0.pdf.
Warped Perception, "Tow Charging Tesla at 70MPH for 25 miles", https://www.youtube.com/watch?v=nILM_DEdBqM.

* cited by examiner

*Primary Examiner* — Todd Melton
(74) *Attorney, Agent, or Firm* — HG LAW LLP

(57)     ABSTRACT

System and methods are disclosed for engaging and disengaging a regenerative braking system of a first vehicle coupled to a second vehicle. In an embodiment, a coupler (e.g., a tow bar) connects the front of a first vehicle (e.g., a towed vehicle) to the rear of a second vehicle (e.g., towing vehicle). The regenerative braking systems includes a motor-generator coupled to a wheel set of the first vehicle and a battery for storing electrical power generated by the motor-generator. The motor-generator is used to apply an accelerating force to the driven wheel set when forward acceleration is needed. The motor-generator is also used to generate electrical power by harnessing the vehicles' momentum to turn the rotor of the motor-generator, which causes a decelerating torque to be applied to the driven wheel set.

20 Claims, 17 Drawing Sheets

300

400                                                            405

405                                                            405

600

605

610

645

650

660

700

720 Coupler
725 Controller

715
Towed Vehicle
(e.g., EV)

710
Towing Vehicle
(e.g., RV)

800

1000

1020 Coupler
1025 Controller

1010
Towing Vehicle
(e.g., RV)

1015
Towed Vehicle
(e.g., EV)

1100

1200

1300

1500

1505

1545

1560

1550

SYSTEMS AND METHODS FOR TOWING ELECTRIC VEHICLES

BACKGROUND

The present disclosure relates to towing vehicles, and in particular to systems and methods for towing electric or hybrid vehicles.

SUMMARY

Many people engage in traveling using recreational vehicles (RVs). Since such vehicles are often large and cumbersome to use for short trips, travelers often take smaller vehicles to be used for running errands or smaller trips once the RV is parked. Typically, such smaller vehicles are small passenger vehicles that are towed by the RV using one of three techniques: tow trailers, tow dollies, and tow bars.

Tow trailers typically support the entire weight of the towed vehicle such that all four wheels of the towed vehicle do not contact the ground while being towed. Tow dollies are used to support the weight of two of the towed vehicle's wheels—usually the front two. The other two wheels remain in contact with the ground and rotate while being towed. Tow bars are typically connected to the front of the towed vehicle and attach the towed vehicle to the rear of the towing vehicle (e.g., the RV). Tow bars allow the towed vehicle to keep all four wheels in contact with the ground while being towed, which causes all four wheels to rotate while the towed vehicle is being towed.

As electric vehicles (EVs) gain popularity, so too do their use with people who travel in RVs. EVs—both combustion-electric hybrids and fully electric vehicles—typically have a battery that stores electric energy and a regenerative braking system that recharges the battery while the EV is coasting or braking, thereby harnessing the kinetic energy of the EV to charge its battery. An EV's regenerative braking system is engaged to generate electrical power when the brakes of the EV are applied. Additionally, the regenerative braking system of an EV is engaged to generate electrical power when the EV is coasting (i.e., when no brakes or throttle is applied). The amount of power generated by the regenerative braking system has a constant relationship with the wheel speed, i.e., directly proportional to the rotational velocity of the wheel set to which it is coupled. Alternatively, the amount of power generated by the regenerative braking system has a variable relationship with the wheel speed, i.e., the amount of power generated is not proportional to the rotational velocity of the wheel set to which it is coupled. In such a configuration, the EV can control the amount of braking force applied as a consequence of the amount of electrical power generated.

Towing an EV using a technique that allows the wheels to rotate while the EV is being towed to charge its battery is typically prohibited by the EV's manufacturer because doing so could damage the towed EV. By preventing owners from towing their EVs, manufacturers deprive the owners from taking advantage of or utilizing the regenerative braking system to recharge the EV while being towed. In view of these deficiencies, there exists a need for improved systems and methods for towing EVs in a way that takes advantage of the benefits afforded to EVs.

To solve these problems, systems and methods are provided herein for towing an EV that takes advantage of the EV's regenerative braking system. In an implementation, the disclosed systems and methods include a coupler (e.g., a tow bar) that connects the front of a towed vehicle (e.g., an EV) to the rear of a towing vehicle (e.g., an RV). Regenerative braking systems typically include a motor-generator coupled to a wheel set of an EV and a battery for storing electrical power generated by the motor-generator. The motor-generator is used to apply an accelerating force to the driven wheel set when forward acceleration is needed by the EV. The motor-generator is also used to generate electrical power by harnessing the EV's momentum to rotate the rotor of the motor-generator, which causes a decelerating torque to be applied to the driven wheel set. In this way, the EV's regenerative braking system applies a decelerating force (i.e., a braking force) to the EV whenever the regenerative braking system is generating electrical power.

In some implementations, the disclosed systems and methods further include a controller communicatively coupled to the towing vehicle and the towed vehicle that transmits information between the towing vehicle and towed vehicle. For example, the controller receives information from the towing vehicle including gear position, throttle and brake pedal positions, turn signal and light information, and error conditions. The controller also receives information from the towed vehicle including charging mode, gear position, regeneration level, force sensor data, turn signal and light information, and error conditions. The controller may transmit such information between the towed vehicle and the towing vehicle as needed. Data communication can be implemented with cables and also with vehicle-to-vehicle (V2V) wireless communication channels. Additionally, the disclosed tow bar may be equipped with springs and/or dampers to absorb the difference of acceleration of the two vehicles momentarily. The disclosed tow bar may implement couplers that can transmit compressive and tensile forces, and may further include brake lines that connect the braking systems of the two vehicles, and additional digital signals.

In an exemplary implementation of the present disclosure, a tow bar is implemented that includes a controller that exchanges information between the towed vehicle (e.g., the EV) and the towing vehicle (e.g., the RV). In some implementations, the tow bar includes sensors that measure tensile and compressive forces of the tow bar (e.g., the forces exchanged between the towing vehicle and the towed vehicle while being towed). The information collected from the sensors may additionally be sent to both vehicles to adjust and/or optimize the acceleration and braking of each vehicle, for example, to provide a smoother ride while minimizing fuel consumption.

In an exemplary implementation, the towing vehicle is embodied by an RV and the towed vehicle is embodied by an EV. In such an implementation, the controller receives information from the RV and the EV, and monitors when the EV can engage its regenerative braking system to simultaneously slow the RV-EV system while generating power for storage in the EV's on-board battery. For example, while the RV is towing the EV down a hill, the RV is either coasting (i.e., no throttle applied) or braking (i.e., applying the braking system to decelerate the RV). In such an implementation, the controller causes the EV's regenerative braking system to engage in a power regeneration mode. While in the power regeneration mode, the regenerative braking system uses the momentum of the EV and RV to rotate the wheels of the EV, which are connected to a motor-generator of the regenerative braking system. When applied, the power regeneration mode uses the kinetic energy of the EV's rotating wheels to turn the rotor of the motor-generator, thereby generating electrical power. The regenerative braking system stores the generated electrical power in a battery for later use. While the regenerative braking system is engaged in the power regeneration mode and generating power, it also applies a braking torque to the wheel set to which it is connected, thereby slowing the RV-EV.

In another exemplary implementation, the regenerative braking system of an EV being towed by an RV is engaged when the RV-EV is traveling downhill without the RV applying its brakes or acceleration using its powertrain. In such an implementation, the controller receives signals from the RV indicating that it is coasting. For example, the controller receives speed information, throttle position information, and braking information from the RV that indicate it is traveling at a constant speed despite the throttle being closed and the brakes not being engaged. In such an implementation, the controller causes the regenerative braking system of the EV to engage in power regeneration mode to generate power while providing a braking force to the RV-EV system.

When calculating the amount of energy that can be recovered using a regenerative braking system, the system's kinetic energy and potential energy is considered. Kinetic energy is the energy that a system has by virtue of it being in motion. Potential energy is the energy that a system has by virtue of its position relative to others (typically its elevation or altitude). Potential energy also includes stresses within the system, its electric charge, and other factors. However, for the purposes of simplicity, only a system's relative position will be considered when determining the system's potential energy.

Kinetic Energy

When a vehicle is moving at a constant velocity, the kinetic energy $E_k$ (in joules or J) can be calculated as follows:

$$E_k = \frac{1}{2}mv^2$$

where m is the mass of the vehicle (in kg) and v is the velocity (in m/s). For example, if a car with a mass of 1,500 kg is moving at 30 m/s (about 67 mph), the kinetic energy is be calculated as:

$$E_k = \frac{1}{2}(1500)(30)^2 = 675 \text{ kJ} = 0.187 \text{ kWh}$$

Assuming 80% (0.15 kWh) can be recovered using a regenerative braking system, and the system includes a 60 kWh battery, the EV generates approximately 0.25% of its battery capacity.

Continuing with the previous example, if the EV is towed by a RV that weighs 5,000 kg, the total mass of the RV-EV combination will be 6,500 kg. The same deceleration using only the regenerative braking system of the EV being towed will result in recovering 0.65 kWh of energy:

$$E_k = \frac{1}{2}(6500)(30)^2 = 2.925 \text{ MJ} = 0.65 \text{ kWh}$$

Potential Energy

When an object is located at a higher location (e.g., above sea level), it has potential energy. The potential energy ($E_p$) can be calculated as follows:

$$E_p = mgh$$

where m is the mass of the vehicle (in kg), g is gravity (approximately 9.8 m/s$^2$), and h is the object's elevation or altitude (in m). In such an example, when an EV of 1,500 kg travels a mountain path that is 1000 meters above sea level, the potential energy is calculated as:

$$E_p = (1500)(9.8)(1000) = 14.7 \text{ MJ} = 4.1 \text{ kWh}$$

If such an EV travels downhill to a destination at sea level, and assuming an 80% regeneration rate, the EV can charge 3.3 kWh of energy. If the RV that is towing the EV weighs 5,000 kg and travels the same route using only the regenerative braking system of the EV, it will generate 14.2 kWh of energy in the EV's battery, which is 24% of the typical EV's battery capacity of 60 kWh. This is enough energy to drive a typical EV approximately 80 km (50 miles). Although the potential energy is discussed herein with respect to the system's relative position to other objects, other factors such as stress, electrical charge, and more may be considered without departing from the contemplated embodiments.

Various implementations of the present disclosure include different charging modes. For example, the present disclosure includes a natural charging mode and a forced charging mode.

Natural Charging Mode

In such an implementation, the EV charges with only the kinetic and potential energy of the system, i.e., the EV's battery is charged by virtue of being towed. The charging rate varies depending on the EV's deceleration and its change in altitude. Natural charging mode is a good option if the anticipated distance to be travelled is sufficient to fully charge the EV's battery when the RV arrives at its destination. In such an implementation, the EV adjusts the level of traction and regenerative braking in response to the state of the towing RV. Additionally, in some implementations, the EV's power train system can be engaged to help the towing RV accelerate (or to supplement its power).

The following table summarizes how the EV responds according to the change of the RV's driving status:

| Driving State | RV's pedals | RV's Gear | EV's Action |
|---|---|---|---|
| Accelerating or traveling uphill | Gas: on Brake: off | Drive | "Push" or no traction |
| Coasting | Gas: off Brake: off | Drive | Neutral (no traction) |
| Normal braking or traveling downhill | Gas: off Brake: low | Neutral or Drive | Normal regenerative braking |
| Hard braking or Stopping | Gas: off Brake: high | Neutral or Drive | Strong regenerative braking |

As illustrated, when it is towed, the EV operates in the "Towing State" so that it will change gears (or driving modes) automatically without a driver. When the towing RV is accelerating or traveling uphill at a constant speed, the EV uses its power train system to supplement the RV's forward force, i.e., "push" the RV. When the EV's charge level is low, it can be pulled in neutral with minimal resistance. This can be safely accomplished by monitoring the compressive and tensile forces between the two vehicles using force sensors equipped within the tow bar. When the RV is coasting, or maintaining speed on a flat road, the EV is pulled with minimal resistance.

When the towing RV decelerates or travels downhill at a constant speed (i.e., without accelerating downhill), the RV driver can "touch" the brake pedal so that it will not (or only minimally) activate the RV's mechanical brake, while illuminating the brake lamp. The EV engages its regenerative braking system to generate power to be stored in its battery while applying a braking force to the RV-EV system. Shifting into neutral is not necessary on an RV equipped with an automatic transmission because the braking force is minimal when it is moving above cruising speed. In an RV equipped with a manual transmission, the driver shifts to neutral (or depresses the clutch pedal) before the vehicle stops; however, the driver should not downshift to use the engine brake because doing so would introduce a braking force that the EV would otherwise apply by virtue of engaging its regenerative braking system.

The RV's throttle pedal, brake pedal, and gear positions may be transmitted to the EV (e.g., via a data cable or wireless V2V communication channel) to activate the EV's regenerative braking system. If the RV driver desires more braking force, or the RV-EV combination is at low speed, the driver depresses the brake pedal with greater force so as to add more braking force to the RV-EV system, increasing the deceleration or stopping the vehicles. In some implementations where it is possible to modify the RV's engine control unit (ECU) software, such gear changes can be automated. In some implementations, the RV shares navigation information and driving states, thereby allowing the EV to automatically steer, make turns, or change lanes.

Forced Charging Mode

In some implementations, the EV can engage its regenerative braking system to charge the EV when a braking force is not needed, although this will significantly increase the fuel consumption of the RV. The disclosed system can monitor the tensile force from force sensors incorporated into a tow bar so that the combustion engine of the RV will not overheat. Such an implementation may not be approved by the EV's manufacturer and may void the warranty of the traction or regenerative braking system. However, some experiments have shown success. For example, a Tesla Model S was tested to charge at 65 kW while being towed at 46 mph (or above). Other experiments have shown slightly lower regenerative braking power recovery. Towing an EV in this way for a short distance can sufficiently charge the EV to be able to drive 4-5 times the distance towed. However, these experiments have shown the fuel consumption of the towing vehicle (e.g., an RV) increases 4-5 times, mostly due to the lower energy transfer efficiency of internal combustion engines than that of electric motors/generators. Such an implementation could be an alternative way to "rescue" an EV with depleted battery.

In another exemplary implementation, the systems and methods disclosed herein include a first vehicle having a regenerative braking system, and a second vehicle coupled to the first vehicle. The second vehicle includes a braking system and a powertrain system. A controller is operably coupled to the first vehicle and the second vehicle and communicates with both. The controller includes a memory, input/output circuitry, and control circuitry. The memory includes non-transitory computer-readable instructions for engaging and disengaging the regenerative braking system. The input/output circuitry configured to receive a brake signal indicating whether the braking system of the second vehicle is engaged from the second vehicle. The input/output circuitry is further configured to receive a throttle signal indicating whether the powertrain system of the second vehicle is engaged and applying a forward force to the second vehicle. The input/output circuitry is further configured to send a regenerate signal to the first vehicle. The control circuitry is configured to determine whether to engage the regenerative braking system in a power regeneration mode based on the brake signal received from the second vehicle. The regenerative braking system includes a battery and a motor-generator coupled to a wheel set of the first vehicle. The power regeneration mode is characterized by engaging the motor-generator to generate electricity that is stored by the battery.

Accordingly, systems and methods are disclosed herein for engaging and disengaging a regenerative braking system of a first vehicle (e.g., an EV) towed by a second vehicle. In an exemplary implementation, the systems and methods disclosed herein receive vehicle speed information relating to a first vehicle having a regenerative braking system. In some implementations, such information is received at a controller. The controller additionally receives vehicle speed information relating to a second vehicle coupled to the first vehicle. In some implementations, the coupler includes a force sensor, and the vehicle speed information relating to the second vehicle is based on force sensor information received from the force sensor. The controller determines whether to engage the regenerative braking system of the first vehicle in a mode of a plurality of modes. In some embodiments, this determination is based on the vehicle speed information relating to the first vehicle and the vehicle speed information relating to the second vehicle. Based on the determination, the controller sends a regeneration signal to the first vehicle that causes the first vehicle to engage the regenerative braking system of the first vehicle in the mode of the plurality of modes.

Additionally, the regenerative braking system includes a first wheel set of the first vehicle coupled to a motor-generator, and a battery. The first vehicle is coupled to the second vehicle via a coupler. In some implementations, the coupler is a tow bar. In other implementations, the coupler is a tow dolly.

In some implementations, the determining includes comparing the vehicle speed information relating to the second vehicle to determine whether a deceleration of the second vehicle exceeds a deceleration threshold. In such an implementation, the mode is a power regeneration mode characterized by engaging the motor-generator to generate electricity that is stored by the battery. In addition, engaging the motor-generator to generate electricity causes a braking torque to be applied to the first wheel set.

In some implementations, the determining further includes comparing the vehicle speed information relating to the second vehicle to determine whether an acceleration of the second vehicle exceeds an acceleration threshold. In such an implementation, the mode is an assist mode characterized by engaging the motor-generator to generate rotational acceleration at the wheel set of the first vehicle.

In some implementations, the first vehicle is an electric vehicle, and the second vehicle is a recreational vehicle.

In some implementations, the coupler is a tow dolly that is attached to a rear section of the second vehicle and lifts a second wheel set of the first vehicle off the ground while the first wheel set remains in contact with the ground.

In some implementations, a mode selection input is received from a user equipment device. In such an implementation, the determining is further based on the mode selection input.

In some implementations, route mapping information is received from the user equipment device. In such an implementation the determining is further based on the route mapping information.

In some implementations, the mode is a forced charging mode characterized by engaging the motor-generator to generate electricity that is stored by the battery. In such an implementation, the mode selection input relates to the forced charging mode.

In another exemplary implementation, the systems and methods disclosed herein receive vehicle speed information relating to a second vehicle coupled to the first vehicle via a coupler. The first vehicle includes a regenerative braking system. In addition, the disclosed systems and methods determine whether to engage the regenerative braking system of the first vehicle in a mode of a plurality of modes. In some implementations, the determination is based on the vehicle speed information relating to the second vehicle. Based on the determination, the disclosed systems and methods engage the regenerative braking system of the first vehicle in the mode of the plurality of modes. The regenerative braking system includes a first wheel set of the first vehicle coupled to a motor-generator, and a battery.

Accordingly, using the techniques described herein, a regenerative braking system of a first vehicle being towed by a second vehicle is engaged and disengaged based on the towing conditions, road conditions, user input, and other factors.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
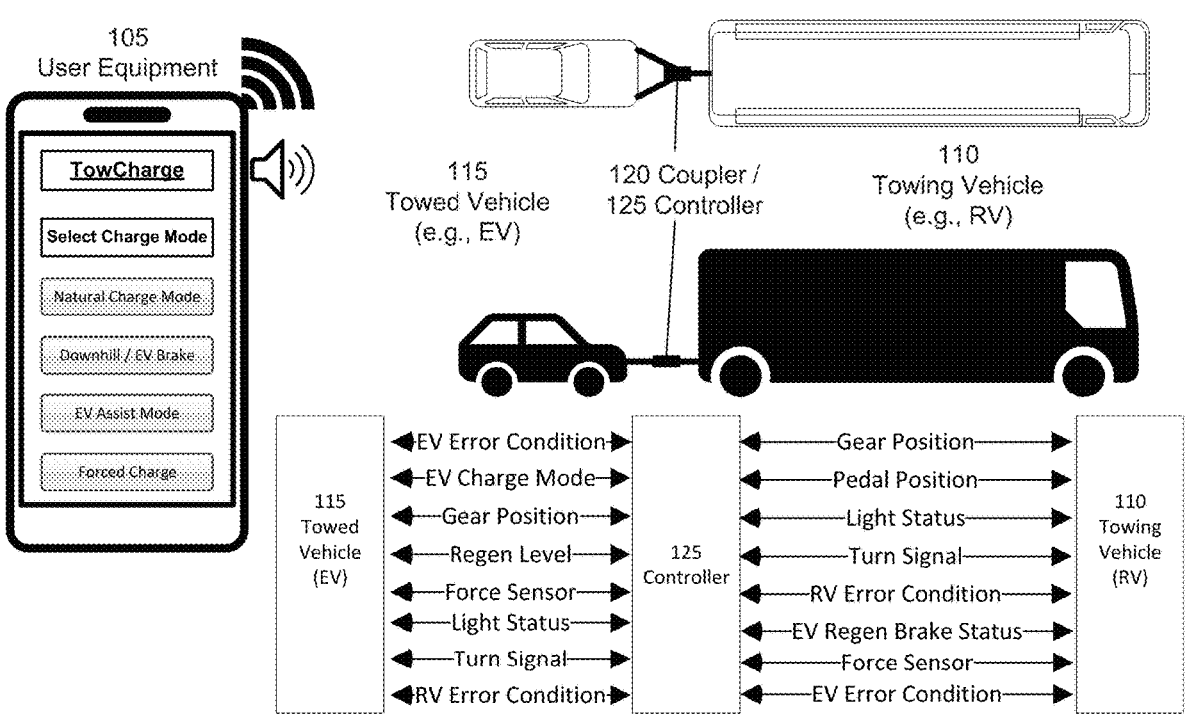
FIG. 1 depicts illustrative diagrams for towing electric vehicles, according to embodiments of the present disclosure.
Figure 1:
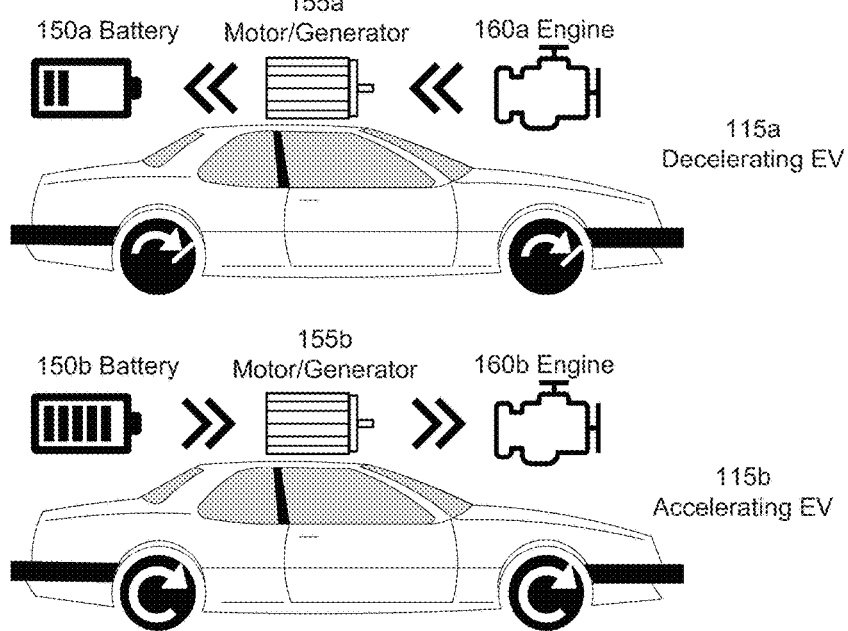

In an exemplary embodiment of the present disclosure and with respect to FIG. 1, the disclosed system for towing an EV includes user equipment 105, towing vehicle 110, towed vehicle 115, coupler 120, and controller 125.

Although towing vehicle 110 may be illustrated and described as a recreational vehicle (RV), vehicle 115, 710, 910, 1010, 1210, 1310, 1410, 1610 may be embodied by any type of vehicle capable of towing another vehicle. For example, towing vehicle 110 may be embodied by any car, truck, van, recreational vehicle, or dedicated towing vehicle (e.g., tow truck). Types of RVs that may be implemented include a fifth wheel, a truck camper, a camper van, a Class A motorhome, a Class B motorhome, a Class C motorhome, a conventional travel trailer, a toy hauler RV, or a super C motorhome. Types of dedicated tow vehicles that may be implemented as towing vehicle 110 include a flatbed tow truck, a rollback tow truck, a hook and chain tow truck, an integrated tow truck, and a wheel lift tow truck.

Although towed vehicle 115 may be illustrated and described as an electric vehicle (EV), any type of vehicle may be implemented as towed vehicle 115 without departing from the contemplated embodiments. For example, towed vehicle 115, 715, 915, 1015, 1215, 1315, 1415, 1615 may be embodied by a battery electric vehicle, a plug-in hybrid electric vehicle, a hybrid electric vehicle, a fuel cell electric vehicle, or a solar electric vehicle. Battery electric vehicles (BEVs) may also be referred to as "all electric vehicles" or "pure electric vehicles." Battery electric vehicles typically rely entirely on electricity and do not include a combustion engine. Battery electric vehicles are typically propelled by one or more electric motors powered by rechargeable batteries. Plug-in hybrid electric vehicles (PHEVs) typically use batteries to power an electric motor and incorporate an internal combustion engine that can recharge the batteries to enable longer driving ranges. A PHEV typically runs on electricity stored in its battery until nearly depleted. The PHEV then automatically switches to the internal combustion engine. Hybrid electric vehicles (HEVs), sometimes referred to as self-charging hybrids, typically use an internal combustion engine and electric motor, which uses electricity stored in its onboard battery. Fuel cell electric vehicles (FCEVs) typically use an alternative fuel (e.g., hydrogen) to power a combustion engine. FCEVs can also convert stored hydrogen into electricity to power electric motors.

Any type of electric vehicle, including those discussed herein, may be equipped with a regenerative braking system that converts kinetic/potential energy of a vehicle into electrical power that is stored in a battery. In certain implementations, regenerative braking systems operate by reversing an electric motor(s) that propels the vehicle. In such implementations, the motor operates similar to a generator and feeds electrical energy into the electrical system.

In an exemplary embodiment, towed vehicle 115 includes a regenerative braking system. In such an embodiment, the regenerative braking system captures the kinetic energy of towed vehicle 115 and stores it in an onboard battery. For example, decelerating EV 115a includes engine 160a, motor/generator 155a, and battery 150a. As illustrated, decelerating EV 115a is decelerating, i.e., reducing its speed over time, for example, by applying its brakes (i.e., braking). While decelerating EV 115a is slowing, its wheels rotate the rotor of motor/generator 155a to generate electricity that is stored in battery 150a. In some embodiments, engine 160a can also be used to turn motor/generator 155a, which generates electricity that is stored in battery 150a. In this way, decelerating EV 115a generates electricity that is stored in battery 150a. Additionally, by using the wheels of decelerating EV 115a to rotate the rotor of motor/generator 155a, a braking torque is applied to the wheels of decelerating EV 115a, thereby increasing the overall braking torque of the wheels of decelerating EV 115a. Although battery 150a is illustrated and described as being located within decelerating EV 115a, battery 150a may be located anywhere without departing from the contemplated embodiments.

In another exemplary embodiment, towed vehicle 115 comprises a regenerative braking system that is capable of adding acceleration to towed vehicle 115. For example, accelerating EV 115b comprises battery 150b, motor/generator 155b, and engine 160b. As illustrated, when accelerating EV 115b accelerates, electricity stored in battery 150b is applied to motor/generator 155b, thereby adding an acceleration force to the wheels of accelerating EV 155b. In some embodiments, both motor/generator 155b and engine 160b apply accelerating force to the wheels of accelerating EV 115b. In this way, motor/generator 155b utilizes power stored in battery 150b to supplement the power that engine 160b applies to the wheels of accelerating EV 115b.

Coupler 120 may be implemented as any type of system or device capable of connecting a towing vehicle to a towed vehicle, or towing a towed vehicle with a towing vehicle, without departing from the contemplated embodiments. For example, coupler 120, 720, 920, 1020, 1220, 1320, 1420, 1620 may be embodied by a tow bar, a car dolly, or a trailer. Additionally, in some embodiments, coupler 120 includes sensors, for example, a force sensor that measures the amount of force experienced within coupler 120 (e.g., the relative forces between towing vehicle 110 and towed vehicle 115). Other types of couplers that can be implemented according to the embodiments disclosed herein, include link and pin couplers, bar couplers, 3-link couplers, screw couplers, buckeye/knuckle couplers, Scharfenberg couplers, Janney couplers, and fully automatic couplers, without departing from the contemplated embodiments.

In an exemplary embodiment, controller 125 is communicatively coupled to towed vehicle 115 and towing vehicle 110. As illustrated, towed vehicle 115 is embodied by an EV and towing vehicle 110 is embodied by an RV. Controller 125 receives information from both towing vehicle 110 and towed vehicle 115 to enable towed vehicle 115 to utilize its regenerative braking system while being towed by towing vehicle 110. For example, controller 125 communicates information to and from towing vehicle 110, for example, gear position, pedal position, light status, turn signal, RV error condition, EV regen brake status, force sensor information, and EV error condition. Additionally, controller 125 communicates information to and from towed vehicle 115, for example, EV error condition, EV charge mode, gear position, regen level, or sensor, light status, turn signal, and RV air condition.

In some embodiments of the present disclosure, systems and methods disclosed herein further include user equipment 105. User equipment 105 is communicatively coupled to controller 125 and enables user input and a user interface for implementing the systems and methods disclosed here in. For example, user equipment 105 may be used to set the mode implemented, for example, natural charge mode, downhill/EV brake mode, EV assist mode, and force charge mode. In some embodiments, controller 125 is implemented at user equipment 105, i.e., controller 125 is built into user equipment 105. In other embodiments, user equipment 105 communicates with controller 125 via any suitable wired or wireless connection (e.g., communication network 1660). Additionally, user equipment 105 may display one or more parameters or settings applicable to towed vehicle 115, towing vehicle 110, coupler 120, or controller 125, or any other information relevant to the system and methods disclosed herein.

Figure 2:
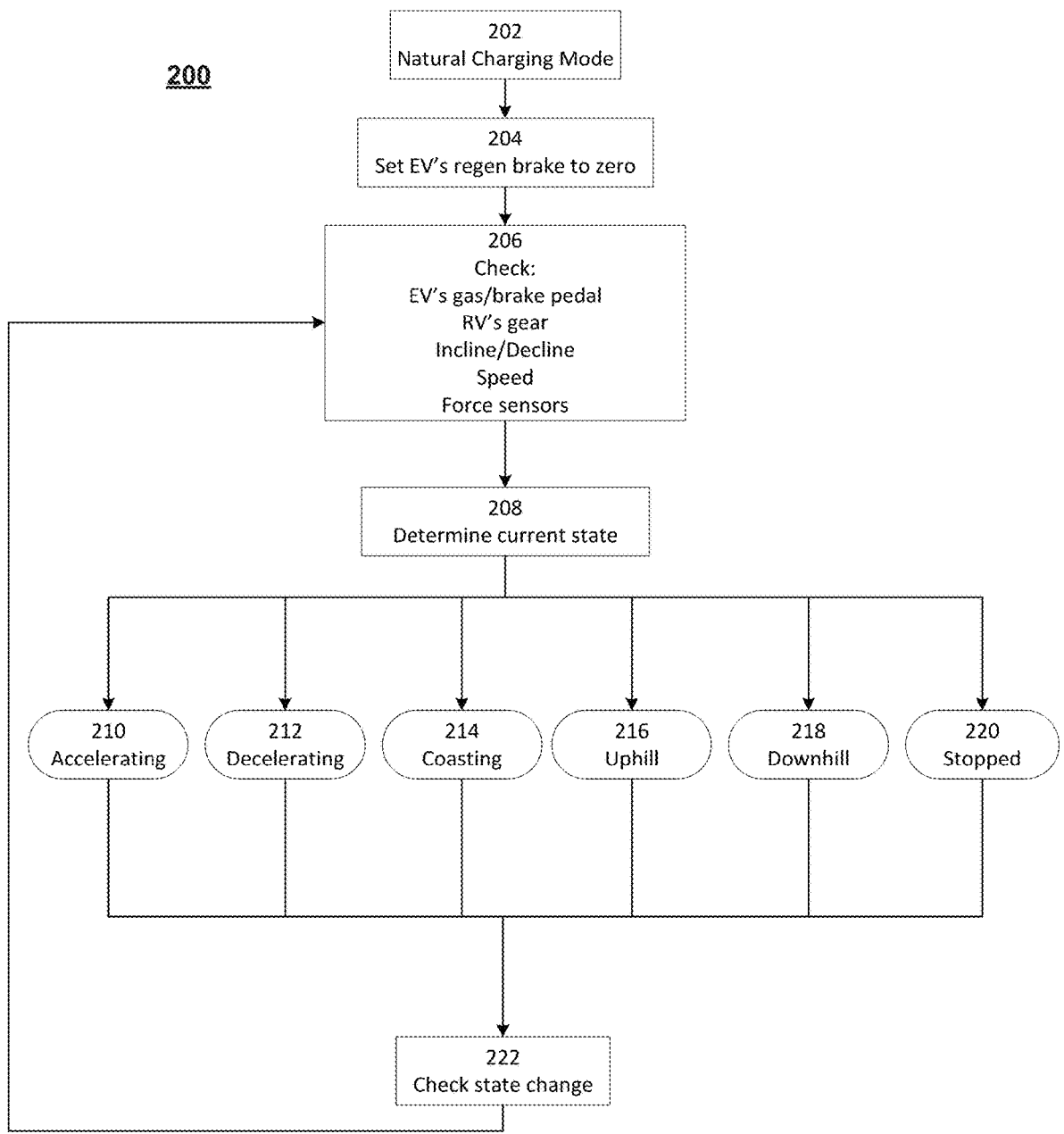
FIG. 2 depicts an illustrative flow chart of a system for towing electric vehicles, according to embodiments of the present disclosure.

In another exemplary embodiment of the present disclosure and with respect to FIG. 2, an illustrative flow chart of process 200 for towing electric vehicles, in accordance with embodiments of the present disclosure. Natural charge mode is generally characterized by a regenerative braking system engaging to convert kinetic/potential energy into electrical energy that is stored in an onboard battery, for example, as discussed with respect to FIG. 1. In some embodiments in natural charging mode, the regenerative braking system will engage to generate electricity while applying a braking torque to the wheels of the vehicle of which the regenerative braking system is included. In other embodiments of natural charging mode, the vehicle travels downhill, and a braking torque is needed to maintain the vehicle's constant speed. In such an embodiment, the regenerative braking system is engaged to generate electricity while applying a braking torque needed to sustain the vehicle's constant or desired speed while traveling downhill.

At step 202, process 200 is set to natural charging mode. In some embodiments, process 200 is automatically or by default set to natural charging mode. In other embodiments, a user-selectable input is received (e.g., from controller 125, 725, 925, 1025, 1225, 1325, 1425, 1625 or user equipment 105, 405, 605, 805, 1105, 1505, 1605) that directs process 200 to engage in natural charging mode. At step 204, the regenerative braking system is set to zero or neutral. At step 206, process 200 checks the state of various parameters, including the EV's throttle position and brake position, RV's gear, whether the RV or the EV is on an incline or decline, the speed of the EV, and the speed of the RV, and force sensors.

At step 208, process 200 determines the current state of the RV-EV combination. For example, process 200 determines that the RV-EV is accelerating by determining that the vehicles' speed increases over time. In such an example, process 200 proceeds to step 210. In some embodiments, at step 210, process 200 undertakes certain steps, for example, those discussed beginning at step 302 as discussed with respect to FIG. 3A.

In another example, process 200 determines that the RV-EV is decelerating by determining that the vehicles' speed decreases over time. In such an example, process 200 proceeds to step 212. In some embodiments, at step 212, process 200 undertakes certain steps, for example, those discussed beginning at step 316 as discussed with respect to FIG. 3A.

In another example, process 200 determines that the RV-EV is coasting (i.e., slowly decreasing its speed without the brakes being applied) by determining that the speed is decelerating while neither the brakes nor the throttle being applied. In such an example, process 200 proceeds to step 214. In some embodiments, at step 214, process 200 undertakes certain steps, for example, those discussed beginning at step 326 as discussed with respect to FIG. 3A.

In another example, process 200 determines that the RV-EV is traveling uphill (i.e., on an incline) by determining that the speed is constant (or at a rate slower than expected) despite the throttle being applied at an amount greater than would be required to maintain a constant speed if the RV-EV was traveling on flat ground. Alternatively or additionally, process 200 determines that the RV-EV is traveling on an incline by determining the vehicle load and comparing it to expected values based on certain conditions. Alternatively or additionally, process 200 determines that the RV-EV is traveling on an incline by receiving information from one or more gyroscopic sensors (or other suitable sensor that determines the RV and/or EV's orientation in three-dimensional space). In such an example, process 200 proceeds to step 216. In some embodiments, at step 216, process 200 undertakes certain steps, for example, those discussed beginning at step 330 as discussed with respect to FIG. 3B.

In another example, process 200 determines that the RV-EV is traveling downhill (i.e., on a decline) by determining that the speed is constant (or at a rate faster than expected) despite the throttle being applied at an amount less than would be required to maintain a constant speed if the RV-EV was traveling on flat ground. Alternatively or additionally, process 200 determines that the RV-EV is traveling on a decline by determining the vehicle load and comparing it to expected values based on certain conditions. Alternatively or additionally, process 200 determines that the RV-EV is traveling on a decline by receiving information from one or more gyroscopic sensors (or other suitable sensor that determines the RV and/or EV's orientation in three-dimensional space). In such an example, process 200 proceeds to step 218. In some embodiments, at step 218, process 200 undertakes certain steps, for example, those discussed beginning at step 344 as discussed with respect to FIG. 3B.

In another example, process 200 determines that the RV-EV is stopped by, for example, determining that its speed is zero. In such an example, process 200 proceeds to step 220. In some embodiments, at step 220, process 200 undertakes certain steps, for example, those discussed beginning at step 354 as discussed with respect to FIG. 3B.

Subsequent to steps 210, 212, 214, 216, 218, or 220, process 200 proceeds to step 222, wherein process 200 determines whether the EV and/or RV exhibit a state change by, for example, returning to step 206 and proceeding therefrom, as discussed above.

Figure 3A:
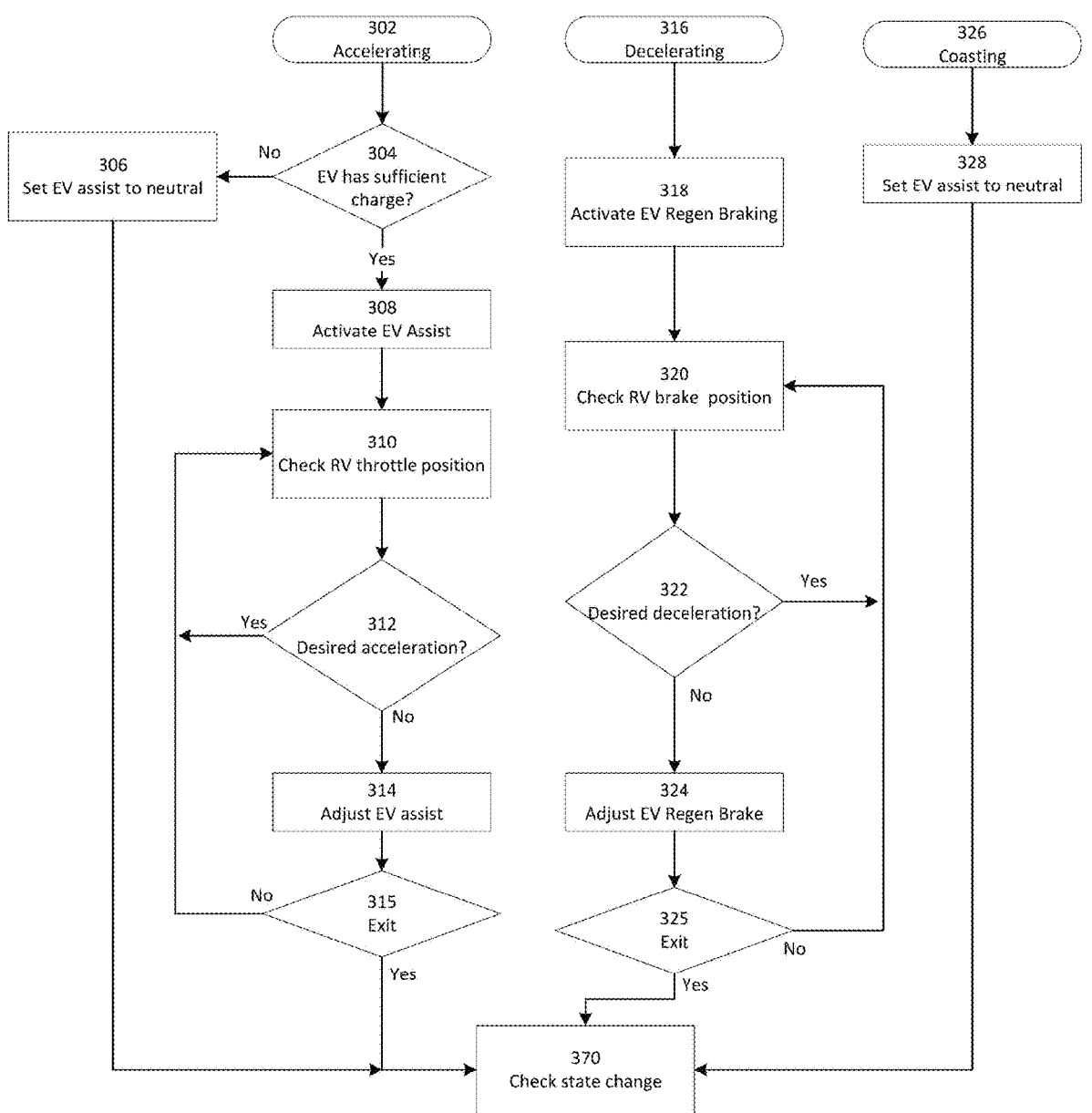
FIGS. 3A-3B depict illustrative flow charts of a system for towing electric vehicles, according to embodiments of the present disclosure.
Figure 3B:
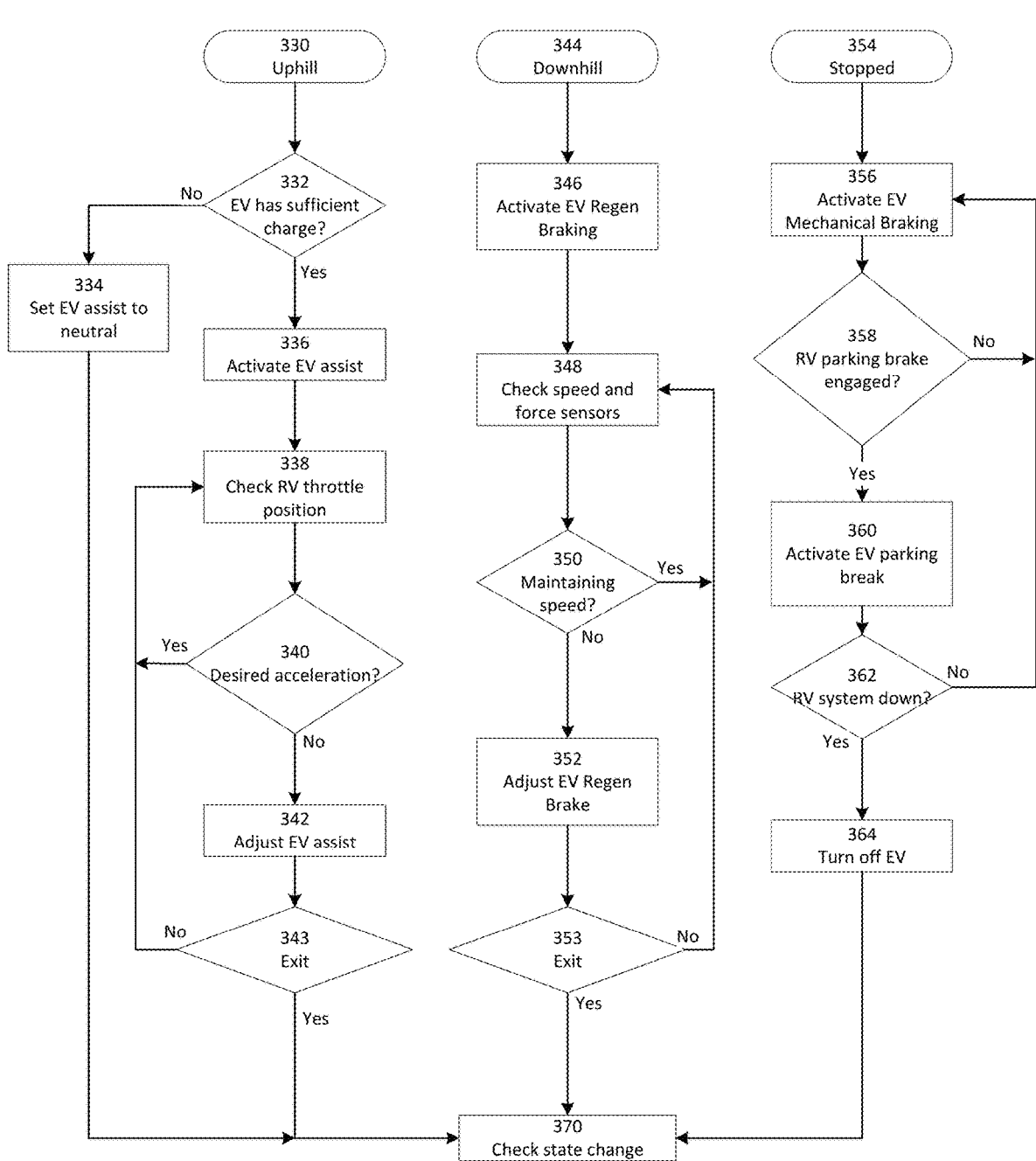

FIGS. 3A-B, depict illustrative flow charts of process 300 for towing electric vehicles, in accordance with embodiments of the present disclosure. At step 302, process 300 determines whether the RV-EV combination is accelerating. For example, process 300 determines whether the RV-EV combination is accelerating by analyzing information received from the RV and/or EV, such as throttle position, brake position, engine speed, and vehicle speed. In such an example, process 300 analyzes the throttle position and vehicle speed to determine whether the vehicles' speed increases over time, and in such an example, process 300 determines that the RV-EV combination is accelerating. In the event that process 300 determines that the RV-EV combination is accelerating, in some embodiments, process 300 proceeds to step 304 where the powertrain system of the EV is used to supplement the forward acceleration of the RV-EV combination.

At step 304, process 300 determines whether the EV possess sufficient charge to engage in EV Assist Mode. In the event that process 300 determines that the EV does not contain sufficient charge, process 300 proceeds to step 306, wherein the EV assist is set to zero or neutral. In the event that process 300 determines that the EV contains sufficient charge to engage in EV Assist Mode, process 300 proceeds to step 308.

At step 308, process 300 activates EV assist. In some embodiments, activating the EV assist activates the EV's powertrain system to supplement the forward acceleration of the RV in the RV-EV combination, thereby increasing the overall acceleration. The EV's (e.g., towed vehicle 115, 715, 915, 1015, 1215, 1315, 1415, 1615) powertrain system includes an internal combustion engine and/or a regenerative braking system (including a motor/generator).

At step 310, process 300 checks the throttle position of the RV. In some embodiments, a signal is received from the RV's throttle position sensor that is analyzed to determine whether the RV's throttle is applied, including its amount and duration. Although determining the RV's throttle position is illustrated and described as analyzing information received from a throttle position sensor at the RV, any technique for determining the throttle position of the RV may be implemented without departing from the contemplated embodiments.

In other embodiments, process 300 does not check the RV's throttle position. Instead, process 300 determines the relative acceleration between the towed vehicle and the towing vehicle by, for example, receiving sensor information from a force sensor included in the coupler (e.g., coupler 120, 720, 920, 1020, 1220, 1320, 1420, 1620). In such an embodiment, if process 300 determines there is a tensile force between the towing vehicle and the towed vehicle, process 300 determines that the towing vehicle is accelerating at a rate higher than that of the towed vehicle. In this way, process 300 remains agnostic to the towing vehicle.

At step 312, process 300 determines whether the RV-EV combination is experiencing the desired acceleration. In some embodiments, process 300 analyzes information from the RV's throttle position sensor to determine whether the desired acceleration is reached. For example, process 300 may determine that the throttle position of the RV increases over time. In such an example, process 300 determines that the desired acceleration is not reached due to the throttle being increased over time. In another example, process 300 analyzes the RV's speed over time. In such an example, the throttle position of the RV increases over time while the vehicle speed remains constant or decreases. In such an example, process 300 determines the desired acceleration is not reached because the RV's speed is constant for decelerating while the throttle position sensor indicates at the throttle is increasing overtime.

In other embodiments, process 300 does not analyze the RV's throttle position information. Instead, process 300 determines the relative acceleration between the towed vehicle and the towing vehicle by, for example, receiving sensor information from a force sensor included in the coupler. In this way, process 300 remains agnostic to the towing vehicle.

In the event that process 300 determines that the desired acceleration is reached, process 300 returns to step 310, as discussed herein. In the event that process 300 determines that the desired acceleration is not reached, process 300 proceeds to step 314. At step 314, process 300 adjusts the amount of EV assist to increase the amount of acceleration of the RV-EV combination. At Step 315, process 300 determines whether to exit accelerating mode. In the event that it does not, process 300 returns to step 308. In the event that it does, process three proceeds to step 370.

At step 316, process 300 determines that the RV-EV combination is decelerating. For example, process 300 analyzes vehicle speed (e.g., the RV's and/or EV's speed) over time to determine that the RV's speed decreases over time. In such an example, process 300 determines that the RV-EV combination is decelerating. In another example, process 300 analyzes braking information (e.g., brake pedal position, braking force applied) to determine whether the RV-EV combination is decelerating. In such an example, process 300 determines that the brakes of the RV's are applied and to what amount/duration. Additionally, process 300 may further consider vehicle speed and throttle position to determine whether the RV-EV combination is decelerating.

In other embodiments, process 300 does consider the RV's braking information. Instead, process 300 determines the relative acceleration between the towed vehicle and the towing vehicle by, for example, receiving sensor information from a force sensor included in the coupler. In such an embodiment, if process 300 determines there is a compressive force between the towing vehicle and the towed vehicle, process 300 determines that the towing vehicle is decelerating at a rate higher than that of the towed vehicle. In this way, process 300 remains agnostic to the towing vehicle.

At step 318, process 300 activates the EV's regenerative braking system. As discussed herein, activating an electric vehicle's regenerative braking system enables it to generate electricity. In so doing, the regenerative braking system applies a braking torque to the wheels of the EV, effectively adding to the braking force of the EV.

At step 320, process 300 checks the RV's brake position. For example, process 300 receives information from a brake pedal position sensor at the RV that indicates whether and to what extent the brakes of the RV are applied. In another example, process 300 receives braking information that indicates the amount of braking force and/or braking torque applied to the brakes of the RV. In some embodiments, process 300 additionally receives and analyzes vehicle speed information and/or throttle position information that is analyzed to determine whether the RV's brakes are applied.

In other embodiments, process 300 does not check the RV's brake position. Instead, process 300 determines the relative acceleration between the towed vehicle and the towing vehicle by, for example, receiving sensor information from a force sensor included in coupler. In this way, process 300 remains agnostic to the towing vehicle.

At step 322, process 300 determines whether the desired deceleration is reached. For example, process 300 analyzes the amount of braking force applied at the RV over time. In some embodiments, the amount of braking force is determined using, e.g., sensor information from one or more force sensors installed at the coupler. In such an example, if the amount of braking force is increased over time, process 300 determines that the desired deceleration is not reached. In the event that the braking force is constant or decreases over time, process 300 determines that the desired deceleration is reached. In the event that process 300 determines that the desired deceleration is reached, process 300 returns to step 320, as discussed herein. In the event that process 300 determines that the desired deceleration is not reached, process 300 proceeds step 324.

At step 324, process 300 adjusts the EV's regenerative braking system to increase or decrease the amount of braking torque applied to the wheels of the EV. For example, to increase the amount of braking torque applied at the EV, the regenerative braking system may be increase so as to generate more electricity at the EV and thus increase the overall braking torque at the EV. In embodiments, process 300 activates the mechanical braking system of the EV to further increase the amount of braking torque applied to the wheels of the EV. At Step 325, process 300 determines whether to exit decelerating mode. In the event that it does not, process 300 returns to step 320. In the event that it does, process 300 proceeds to step 370.

At step 326, process 300 determines whether the RV-EV combination is costing, i.e., moving forward without any braking or throttle applied. For example, process 300 analyzes throttle information, braking information, and/or vehicle speed information to determine whether the RV-EV combination is costing. In other examples, process 300 determines whether the RV-EV combination is coasting by analyzing force sensor information. At step 328, process 300 sets the EV assist to neutral and proceeds to step 370.

At step 330, process 300 determines whether the RV-EV combination is traveling uphill, i.e., on an incline. At step 332, process 300 determines whether the EV has sufficient charge to engage in EV assist mode. In the event that process 300 determines that the EV does not have sufficient charge, process 300 proceeds to step 334. At step 334, process 300 sets the EV assist to neutral. In the event that process 300 determines that the EV has sufficient charge, process 300 proceeds to step 336.

At step 336, process 300 activates the EV assist. For example, activating the EV assist includes activating the EV's powertrain system to increase the overall forward acceleration of the RV-EV combination, thereby supplementing the power of the RV.

At step 338, process 300 checks the RV's throttle position. For example, process 300 receives throttle information from a throttle position sensor of the RV and analyzes it to determine throttle position. In another example, process 300 receives pedal information from the RV and analyzes it to determine the RV's pedal position. In other embodiments, process 300 does not check the RV's throttle position. Instead, process 300 analyzes sensor information, e.g., force sensor information, and determines the relative acceleration of RV and the EV to determine whether the desired acceleration is reached.

At step 340, process 300 determines whether the RV-EV combination has reached the desired acceleration. In the event that the desired acceleration is reached, process 300 returns to step 338. In the event that process 300 determines that the desired acceleration is not reached, process 300 proceeds to step 342. At step 342, process 300 adjusts the amount of EV assist. For example, in the event that process 300 determines that additional acceleration is needed, process 300 increases the amount of forward force the EV's powertrain system applies to the RV-EV combination, thereby increasing the overall acceleration. In another example, in the event that process 300 determines that less acceleration is needed, process 300 reduces the amount of EV assist by reducing the output of the EV's powertrain system. In this way, the overall acceleration of the RV-EV combination is increased by increasing the output of the EV's powertrain system, and is reduced by decreasing the output from the EVs powertrain system.

At step 343, process 300 determines whether to exit uphill mode. In the event that it does not, process 300 returns to step 338. In the event that it does, process 300 proceeds to step 370.

At step 344, process 300 determines that the RV-EV combination is traveling downhill, i.e., on a decline. At step 346, process 300 activates the EV's regenerative braking system. At step 348, process 300 checks various sensors, for example, speed and force sensors. Speed sensor information is received from a speed sensor at the RV, a speed sensor at the EV, or both. Additionally, speed information can be received from a global positioning satellite (GPS) system or other system capable of determining the speed of the RV-EV combination. In some embodiments, the RV-EV combination includes force sensors. For example, a coupler connecting the EV to the RV includes force sensors that measure the amount of force in the coupler created by relative acceleration differences between the EV and the RV.

At step 350, process 300 determines whether the RV-EV combination is maintaining its speed. In the event that the RV-EV combination is maintaining its speed, process 300 returns to step 348, as discussed herein. In the event that process 300 determines that the RV-EV combination is not maintaining its speed, process 300 proceeds to step 352.

At step 352, process 300 adjusts the EV's regenerative braking system. For example, in the event that the RV-EV combination is slowing, and process 300 determines that such deceleration is not desired (e.g., by analyzing information from the RV and/or EV), process 300 decreases the EV's generative braking system, thereby decreasing the amount of braking torque applied to the EV's wheels. In the event that the RV-EV combination is accelerating, and process 300 determines that such acceleration is not desired (e.g., by analyzing information from the coupler, sensors, the RV, and/or EV), process 300 increases the EV's regenerative braking system, thereby increasing the amount of braking torque applied to the EV's wheels. In this way, process 300 maintains a constant speed while traveling on a decline by increasing or decreasing the amount of braking torque applied at the EV by adjusting the EV's regenerative braking system. At Step 353, process 300 determines whether to exit downhill mode. In the event that it does not, process 300 returns to step 348. In the event that it does, process 300 proceeds to step 370.

At step 354, process 300 determines whether the RV-EV combination is stopped. For example, process 300 analyzes vehicle speed information. In the event that process 300 determines the speed is zero, process 300 determines the vehicles have stopped. At step 356, process 300 activates the EV's mechanical braking system. For example, process 300 activates the EV's hydraulic brakes, thereby applying a braking torque at the EV.

At step 358, process 300 determines whether the RV's parking brake is engaged. Parking brakes are typically a mechanism used to keep a vehicle securely motionless when parked and may also be referred to as a handbrake or an emergency brake. Parking brakes often consist of a pulling mechanism attached to a cable which is connected to one or more of the brakes. In other embodiments, parking brakes can be activated and deactivated by onboard systems without a user having to pull on a lever or perform some other action. Additionally, parking brakes are typically independent of hydraulic brake systems and are able to be activated independent of a vehicle's hydraulic braking system. In the event that process 300 determines that the RV's parking brake is not engaged, process 300 returns to step 356, as discussed herein. In the event that process 300 determines that the RV's parking brake is engaged, process 300 proceeds to step 360. In some embodiments, process 300 determines whether the RV's parking brake is applied without reading any signals from the RV. Instead, process 300 reads sensor information (e.g., sensors included at the EV or coupler) to determine the parking state of the RV. In this way, process 300 is agnostic to the RV.

At step 360, process 300 activates the EV's parking brake. In some embodiments, process 300 ensures that every time the RV's parking brake is engaged, the EV's parking brake is also engaged. In some embodiments however, the EV's parking brake system is not engaged when the RV parking brake system is engaged, and vice versa. In yet other embodiments, process 300 does not receive any information originating from the RV.

At step 362, process 300 determines whether the RV system is down, i.e., the RV is powered down or shut off. In the event that process 300 determines that the RV is not powered down, process 300 returns to step 356, as discussed herein. In the event that process 300 determines that the RV is powered down, process 300 proceeds step 364. At step 364, process 300 turns off one or more systems at the EV. Subsequent to steps 364, process 300 proceeds to step 370.

At step 370, process 300 determines whether the state of the RV-EV combination has changed. In some embodiments, process 300 determines whether the EV and or the RV exhibit state change by, for example, proceeding to step 206, as discussed with respect to FIG. 2.

Figure 4A:
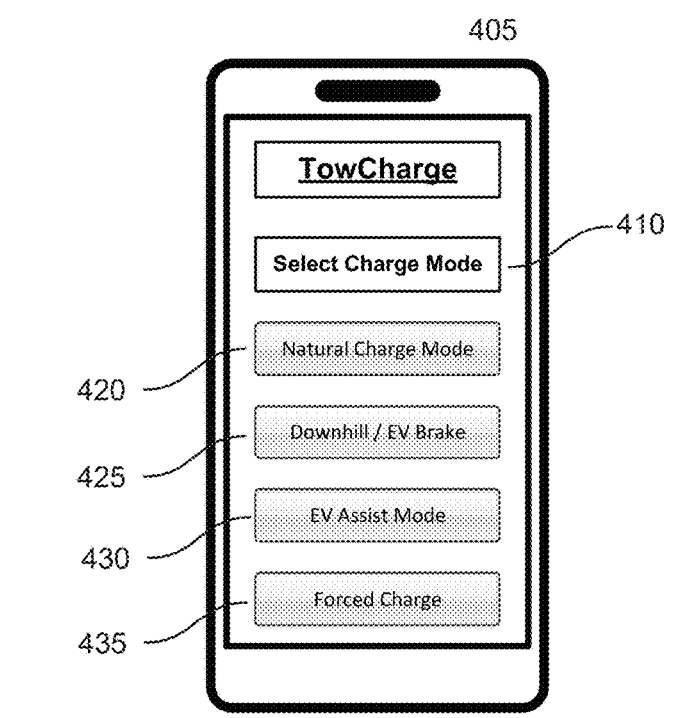
FIGS. 4A-4B depict illustrative user interfaces of a system for towing electric vehicles, according to embodiments of the present disclosure.
Figure 4B:
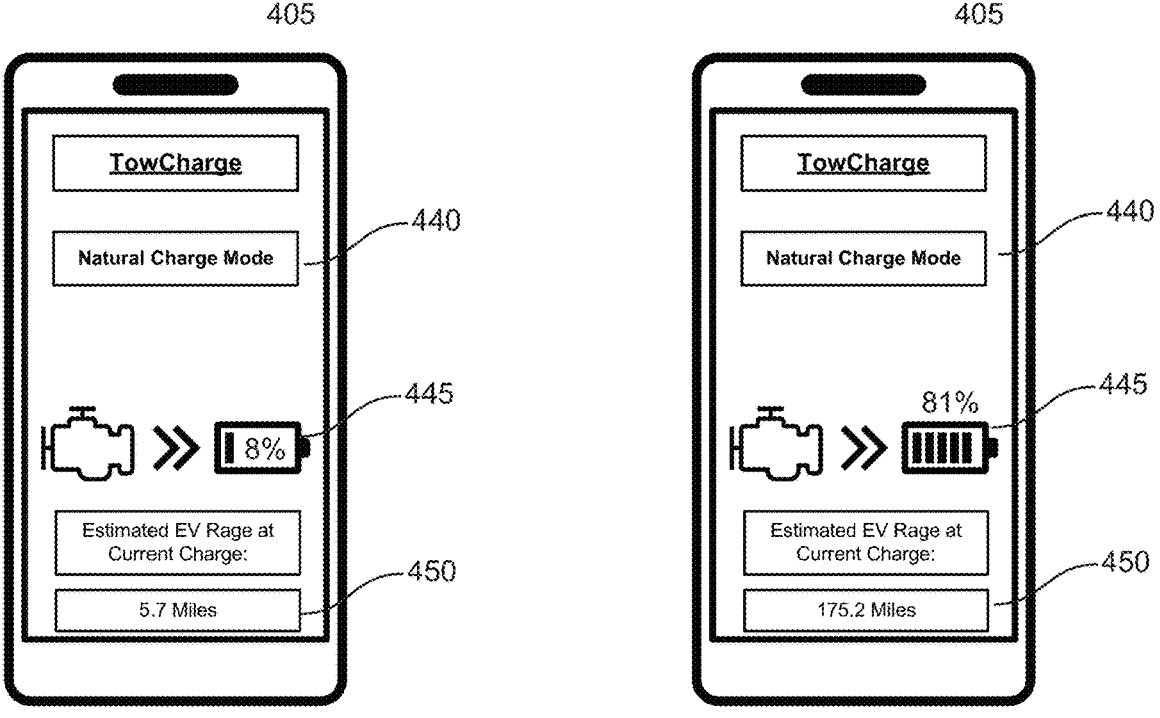

In another exemplary embodiment of the present disclosure and with reference to FIGS. 4A-4B, user equipment 405 includes a display screen on which information displayed, for example, to a user. Although user equipment 105, 405, 605, 805, 1105, 1505, 1605 may be illustrated and described as a mobile telephone, user equipment 105, 405, 605, 805, 1105, 1505, 1605 may be embodied by a cellular telephone, a tablet, a laptop computer, a computer, a smartwatch (or other wearable technological device), a standalone navigation system, a navigation system attached to, or built in, a vehicle (e.g., a vehicle navigation system or an infotainment system), a trailer braking system, a controller, or any other device capable of implementing the systems, methods, and techniques described herein.

FIGS. 4A-4B illustrate exemplary embodiments of user equipment 105, 405, 605, 805, 1105, 1505, 1605. In an embodiment, user equipment 405 displays prompt 410. As illustrated, prompt 410 displays a prompt relating to a user selectable input, for example, natural charge mode 420, Downhill/EV Brake 425, EV Assist Mode 430, and Force Charge 435.

In some embodiments, the user selectable inputs are selected by, for example, a user, i.e., a user specifies whether to engage or disengage various modes, e.g., accelerating (as discussed at step 210 in FIG. 2 and beginning at step 302 in FIG. 3A), decelerating (as discussed at step 212 in FIG. 2 and beginning at step 316 in FIG. 3A), coasting (as discussed at step 214 in FIG. 2 and beginning at step 326 in FIG. 3A), uphill (as discussed at step 216 in FIG. 2 and beginning at step 330 in FIG. 3B), downhill (as discussed at step 218 in FIG. 2 and beginning at step 344 in FIG. 3B), and stopped (as discussed at step 220 in FIG. 2 and beginning at step 354 in FIG. 3B).

In other embodiments, user equipment 405 displays only two modes. For example, user equipment 405 displays user selectable inputs for natural charging mode and forced charging mode. In such an embodiment, system 400 engages and disengages the regenerative braking system based on road/towing conditions. For example, system 400 receives an input from user a selectable input engaging in natural charge mode. Once selected, system 400 determines road/ towing conditions and engages the regenerative braking system to, for example, generate power and charge the battery when the RV-EV combination is decelerating or traveling on a decline. Continuing with the same example, user equipment 405 receives an input from a selectable input engaging forced charge mode. Once selected, system 400 engages the regenerative braking system to continuously generate power. Although embodiments are illustrated and described as displaying a specific number of modes, e.g., two or four, any number of modes can be displayed and implemented without departing from the contemplated embodiments.

In other embodiments, the charge modes are selected automatically, i.e., by system 400. In such an embodiment, system 400 determines a charge mode based on one or more inputs. For example, system 400 determines that the RV-EV combination is traveling on a relatively flat road and, in such an example, system 400 determines that natural charge mode is optimal for the given conditions. In another example, system 400 determines that the RV-EV combination is traveling downhill. In such an example, system 400 determines that the Downhill/EV Brake charge mode is optimal for the given conditions. In yet other embodiments, system 400 considers mapping information (e.g., as discussed with respect to FIGS. 15 and 16) to determine the optimal mode.

FIG. 4B illustrates an exemplary embodiment where natural charge mode has been selected (either by a user selecting user selectable input 420 or by being selected by system 400). As illustrated, user equipment 405 displays charge mode indicator 440, indicating that system 400 is engaged in natural charge mode. While in natural charge mode, user equipment 405 displays charge indicator 445. As illustrated, charge indicator 445 illustrates that the power capacity of the regenerative braking system of the EV (e.g., the capacity of the EV's onboard battery) is relatively low, as indicated by the battery icon displaying only one bar. Additionally, charge indicator 445 displays a percentage of the EV's charge. In some embodiments, user equipment 405 further displays range 450 that indicates an estimated distance that the EV can travel at its current charge level. As illustrated in FIG. 4B, user equipment 405 illustrates system 400 displaying that the estimated EV range at current charge is approximately 5.7 miles. Conversely, user equipment 405 illustrates that the EV could travel approximately 175.2 Miles on the charge indicated. Although charge indicator 445 and approximate distance 450 are displayed while in natural charge mode, such information can be displayed while system 400 is engaged in any mode, without departing from the contemplated embodiments.

Figure 5:
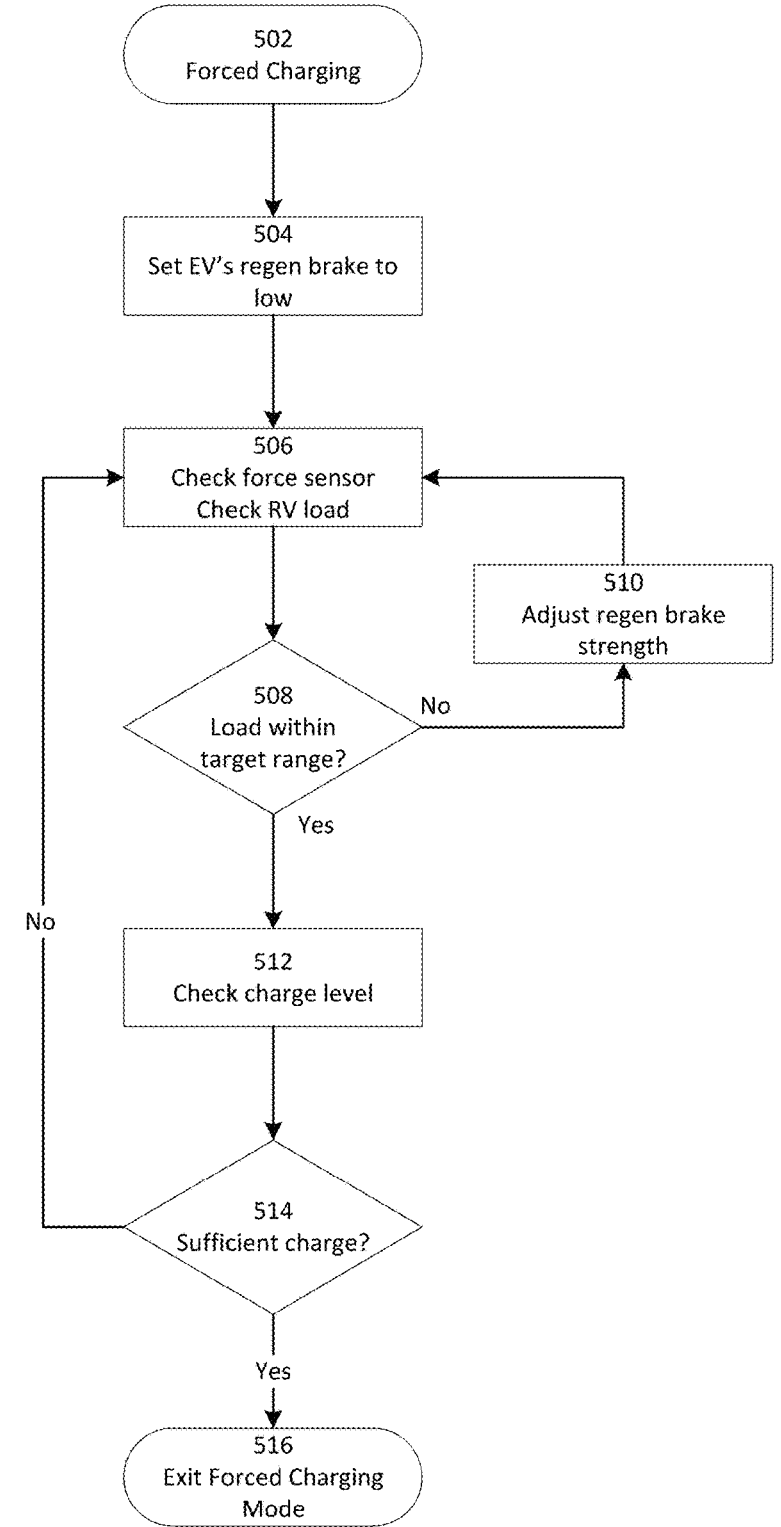
FIG. 5 depicts an illustrative flow chart of a system for towing electric vehicles, according to embodiments of the present disclosure.

In another exemplary embodiment of the present disclosure and with reference to FIG. 5, system 500 is engaged in forced charging mode. Forced charging mode can be used to charge an EV by towing it behind a towing vehicle, for example, and RV, while the regenerative braking system of the EV is continuously engaged. Forced charging mode increases towing load on the towing vehicle, causing it to consume more fuel. However, the forced charging mode prioritizes generating power at the EV.

At step 502, system 500 engages forced charging mode. Forced charging mode can be engaged by receiving a signal from a user selectable input directing system 500 to engage in such mode. Alternatively, system 500 determines to engage forced charging mode. At step 504, system 500 sets the EV's regenerative braking system to low. At step 506, system 500 checks force sensors and/or checks the RV load. In some embodiments, force sensors are included in the coupler that connects the EV to the RV. Such force sensors measure the force exerted between the two vehicles, whether in tension or compression. For example, if system 500 determines that there is a tensile force between the RV and the EV, system 500 determines that the RV is exhibiting a "pulling" force on the EV. Although the systems and methods described herein may be illustrated with a linear force sensor, i.e., one that reads purely tension or compression, any type of force sensor can be implemented without departing from the contemplated embodiments. For example, inductive force sensors, high-frequency oscillation force sensors, magnetic inductive force sensor, capacitive force sensor, analog capacitive sensor, miniature capacitive sensor, high temperature capacitive sensor, piezoelectric force sensor, piezoresistive force sensor, flexiforce force sensors, strain gauges, accelerometers, and optical force sensors may be implemented without departing from the contemplated embodiments. Moreover, any number and/or combination of force sensors can be implemented (including zero) without departing from the contemplated embodiments.

In another example, system 500 determines the RV load by receiving and analyzing various signals. In such an example, system 500 receives and examines the RV's gear position, pedal position, throttle position, engine speed, and any RV error conditions. Examining and determining the RV's load is beneficial as it minimizes the wear and tear on the RV and mitigates the possibility that the RV will overheat or experience other problematic conditions as a result from the RV being overloaded.

At step 508, system 500 determines whether the load is within a target range. In the event that system 500 determines that the load is not within the target range, system 500 proceeds to step 510. At step 510, system 500 adjusts the regenerative braking system of the EV. For example, if the RV is overloaded, system 500 reduces the EV's regenerative braking system to reduce the amount of load on the RV. In another example, if the RV's load is below the target range, system 500 increases the regenerative braking system of the EV, thereby increasing the load on the RV. Subsequent to step 510, system 500 returns to step 506.

Returning to step 508, in the event that system 500 determines that the RV load is within the target range, system 500 proceeds to step 512. At step 512, system 500 checks the charge level of the EV. At step 514, system 500 determines whether the EV's battery is sufficiently charged. The amount of charge considered to be sufficient can vary based on a number of factors. For example, the target level may be user specified, for example, by receiving an input at a user equipment device to set a specific charge level. Such charge levels can be any level, varying between 0 and 100%, and in some embodiments, greater than 100%. For example, user equipment specifies that the sufficient charge level is 50% of the EV's capacity. In such an example, system 500 determines whether the EV has been charged to a 50% capacity.

In other embodiments, the sufficient charge level is related to the distance the EV can travel on the charge. For example, the sufficient charge can be determined by the EV being able to travel, e.g., 50 miles. In the event that system 500 determines that the EV charge level is insufficient, system 500 returns to step 506, as discussed herein. In the event that system 500 determines that the EV's charge level is sufficient, system 500 proceeds to step 516, where system 500 exits the forced charging mode.

Figure 6:
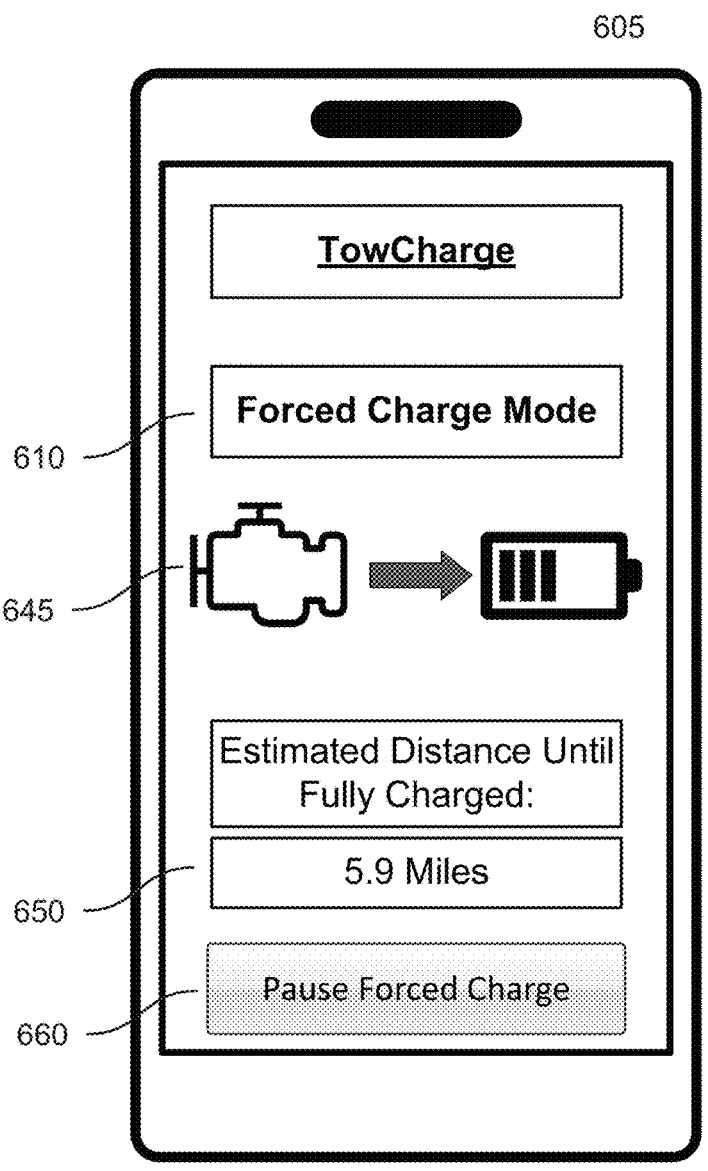
FIG. 6 depicts an illustrative user interface of a system for towing electric vehicles, according to embodiments of the present disclosure.

In another exemplary embodiment of the present disclosure and with reference to FIG. 6, user equipment 605 displays a user interface indicative of forced charging mode. As illustrated, mode indicator 610 indicates that system 600 is engaged in forced charge mode. User equipment 605 displays charge indicator 645. As illustrated, charge indicator 645 illustrates an arrow from the motor to the battery, indicating that the regenerative braking system of the RV is engaged.

In some embodiments, system 600 determines the distance the EV will need to be towed in forced charge mode to reach 100% charge (i.e., fully charged). As illustrated, indicator 650 indicates that the EV will need to be towed 5.9 miles until it is fully charged.

User equipment 605 displays user selectable input 660 that, when selected, pauses or suspends forced charge mode. Pausing forced charge mode, for example by selecting input 660, reduces the load on the RV. Pausing or suspending forced charge mode may be used where the RV requires additional acceleration, for example, when traveling on an incline or passing another vehicle in the roadway. In some embodiments, system 600 automatically pauses forced charge mode in certain conditions. For example, if system 600 determines that the RV is in danger of being overloaded (e.g., because it is traveling on an incline), system 600 pauses forced charge mode to prevent the RV from being overloaded.

Figure 7:
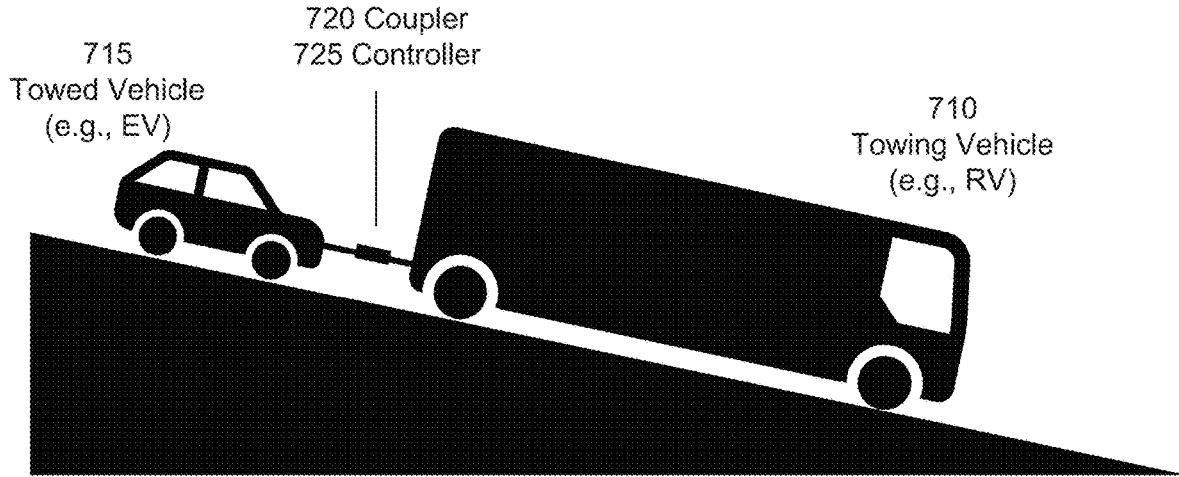
FIG. 7 depicts an illustrative diagram for towing electric vehicles, according to embodiments of the present disclosure.

In another exemplary embodiment of the present disclosure and with reference to FIG. 7, towing vehicle 710 is coupled to towed vehicle 715 via coupler 720. In the illustrated embodiment, towing vehicle 710 is embodied by an RV and towed vehicle 715 is embodied by an EV. Although certain embodiments of the present disclosure are illustrated and described as the towing vehicle being embodied by a recreational vehicle, any vehicle capable of pulling or towing another vehicle may be implemented as towing vehicle 710, without departing from the contemplated embodiments. Additionally, although certain embodiments of the present disclosure are illustrated and described as the towed vehicle 715 being embodied by an electric vehicle, any type of vehicle may be implemented as towed vehicle 715, without departing from the contemplated embodiments.

As illustrated, RV 710 tows EV 715 on a decline, i.e., downhill. In an embodiment, controller 725 determines that the RV-EV 710, 715 combination is traveling on a decline. In some embodiments, controller 725 determines that the vehicles are traveling on a decline by analyzing speed information relating to RV 710 and/or EV 715. For example, controller 725 receives speed sensor and/or throttle information from coupler 720, RV 710, and/or EV 715. Controller 725 determines that the speed of the vehicles is constant (or at a rate faster than expected) despite the throttle or the RV 710 being applied at an amount less than would be required, as determined, to maintain a constant speed if the RV-EV 710, 715 was traveling on flat ground. Alternatively or additionally, controller 725 determines that the RV 710 and the EV 715 are traveling on a decline by receiving information from one or more gyroscopic sensors (or other suitable sensor that determines the RV and/or EV's orientation in three-dimensional space). In other embodiments, controller receives information from, for example, a user equipment device resulting from a user selectable input indicating that system 700 is engaged in Downhill/EV Brake Mode, for example, in step 216 as discussed with respect to FIG. 2 or step 344 as discussed with respect to FIG. 3B.

Figure 8:
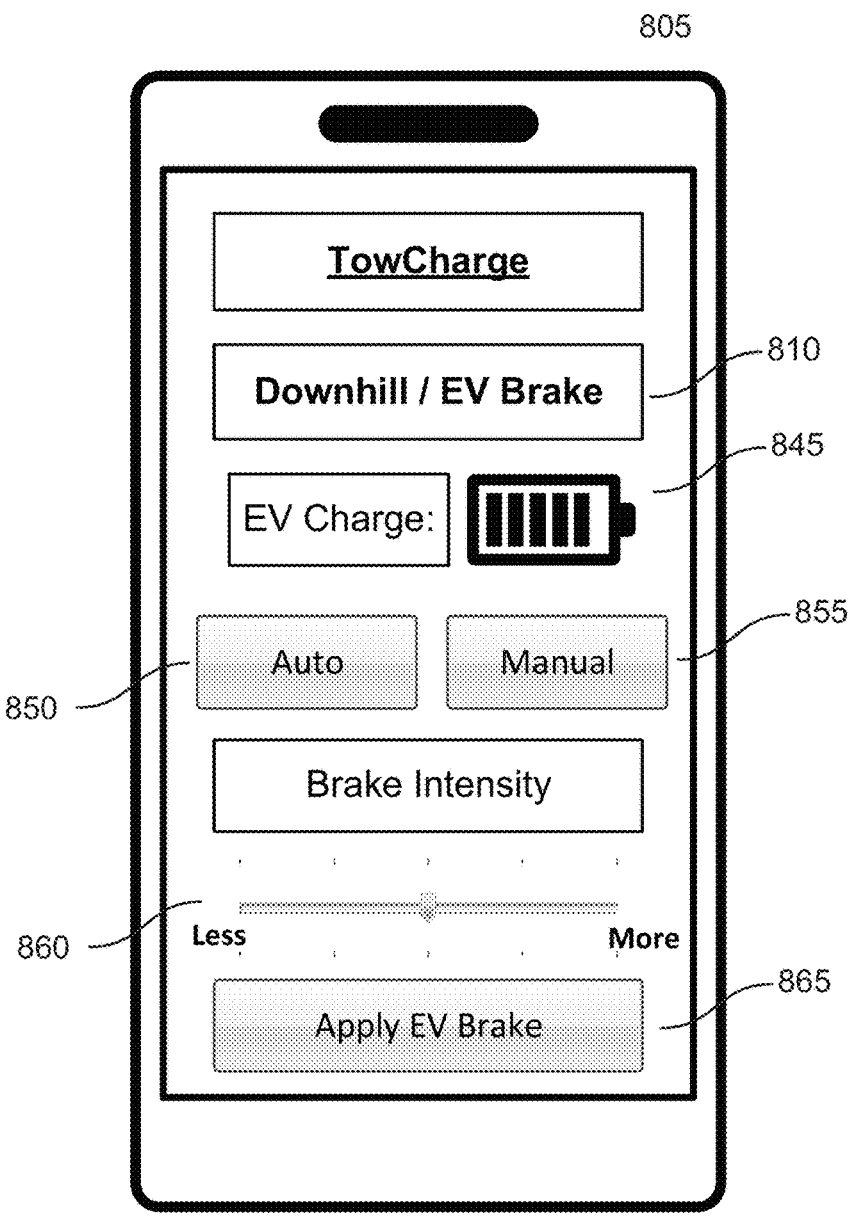
FIG. 8 depicts an illustrative user interface of a system for towing electric vehicles, according to embodiments of the present disclosure.

In another exemplary embodiment of the present disclosure and with reference to FIG. 8, system 800 includes user equipment 805. As illustrated, user equipment 805 is implemented in an environment where an RV-EV combination is traveling on a decline, for example, as discussed with respect to FIG. 7. In some embodiments, user equipment 805 displays indicators, for example, charge mode indicator 810 and charge indicator 845. In some embodiments, user equipment 805 also displays user selectable inputs 850, 855, and 865, as well as brake level selector 860.

In operation and as illustrated, user equipment 805 is implemented in Downhill/EV Brake mode, as indicated by mode indicator 810. System 800 determines whether the regenerative braking system of the EV should be activated based on traveling on a decline. For example, system 800 applies the regenerative braking system of the EV to apply a braking torque at the wheels of the EV so as to maintain a constant speed despite the RV-EV combination traveling on a decline.

In some embodiments, user selectable input 865 may be selected to manually apply the EV's regenerative braking system. In such an embodiment, user selectable input 860 may be manipulated to increase or decrease the brake intensity applied by the EVs regenerative braking system. In other embodiments, system 800 automatically applies the regenerative braking system of the EV. Although indicators 810, 845 and user selectable inputs 850, 855, 860, and 865 are illustrated and described as being implemented on user equipment 805 in a specific mode (as illustrated, Downhill/EV Brake mode), such user selectable inputs and indicators can be used in any mode without departing from the contemplated embodiments.

Figure 9:
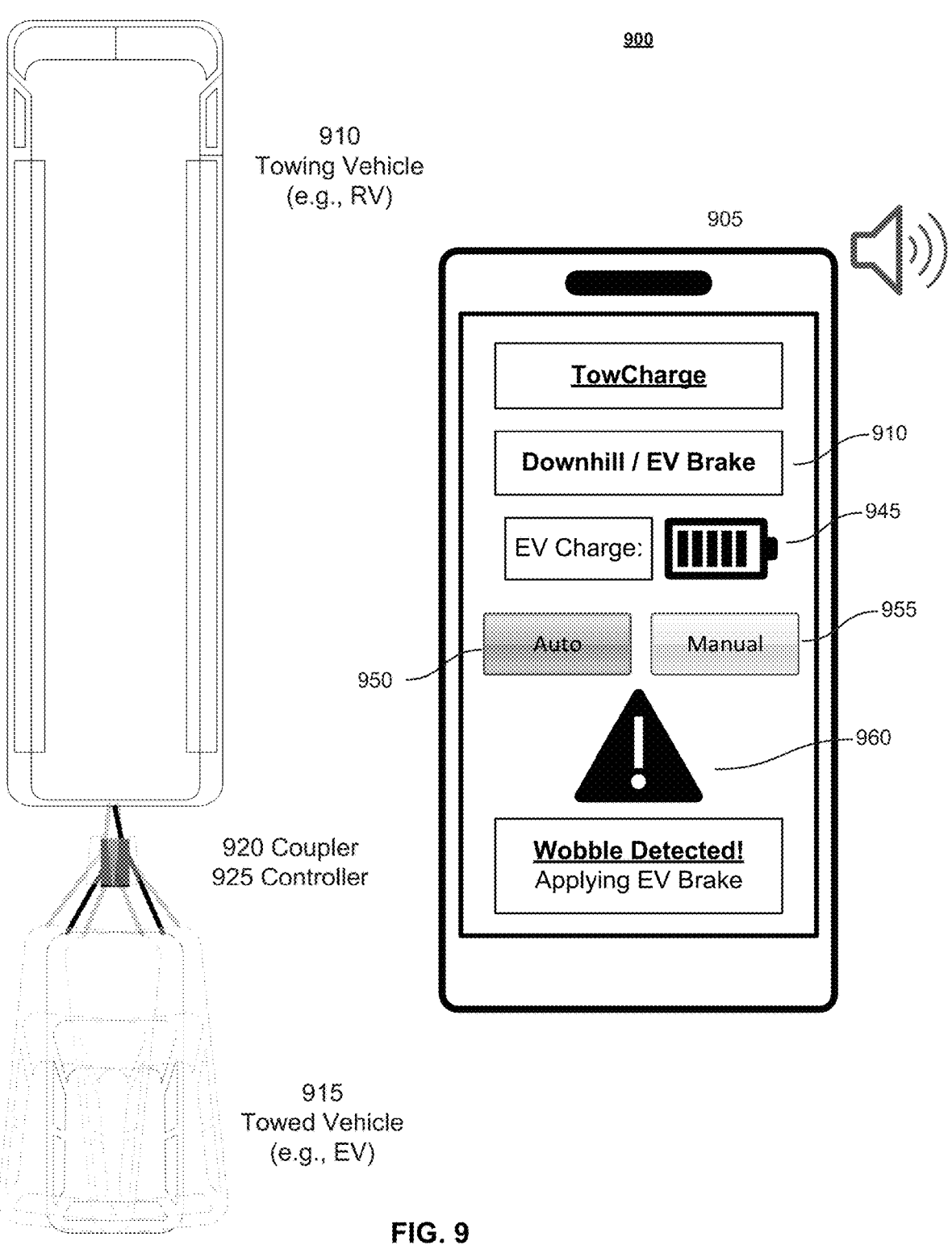
FIG. 9 depicts an illustrative user interface and a diagram of a system for towing electric vehicles, according to embodiments of the present disclosure.

In another exemplary embodiment of the present disclosure and with reference to FIG. 9, system 900 is implemented where trailer wobble is detected. Trailer wobble, also referred to as trailer sway or fishtailing, occurs when a trailer or towed vehicle begins to move from side-to-side while being towed. Trailer wobble is dangerous and can lead to damage and possibly result in the trailer or towed vehicle being flipped. System 900 detects trailer sway or wobble and corrects it by, for example, selectively applying the brakes of the towed EV 915 and/or the RV 910. In an exemplary embodiment and as illustrated, towing vehicle 910 is coupled to towed vehicle 915 via coupler 920. In the illustrated embodiment, towed vehicle 910 is embodied by an RV and towed vehicle 915 is embodied by an EV. In the event system 900 detects wobble, system 900 applies the brakes of EV 915. In some embodiments, system 900 applies the regenerative braking system of EV 915. And other embodiments, system 900 applies the mechanical brakes of EV 915. And other embodiments, system 900 applies both the regenerative braking system and mechanical brakes of EV 915 to eliminate the wobble.

System 900 utilizes different techniques for detecting wobble. For example, system 915 receives force sensor information from force sensors that indicate the presence of wobble. For example, such force sensors can be implemented at towed vehicle (EV) 915, towing vehicle (RV) 910, and/or at coupler 920. Additionally or alternatively, accelerometers are implemented at RV 910, EV 915, and/or coupler 920 that are capable of measuring the lateral acceleration of RV 910, EV 915, and/or a coupler 920. In such an example, the force sensor information and/or accelerometer information can be received by controller 925, which analyzes the force sensor information to determine the presence of wobble.

In an embodiment, when system 900 detects the presence of wobble, user equipment 905 displays wobble indicator 960. As illustrated, wobble indicator 960 includes a graphic indicating that wobble is detected and, in some embodiments, further indicates that the EV's 915 regenerative braking system is activated. In some embodiments, user equipment 905 additionally plays an audio indicator, for example, a chime, alert, buzzer, or voice-based indicator. Although system 900 is illustrated as detecting and rectifying wobble while in Downhill/EV Brake mode, system 900 can implement wobble detection and rectifying in any mode, without departing from the contemplated embodiments.

Figure 10:
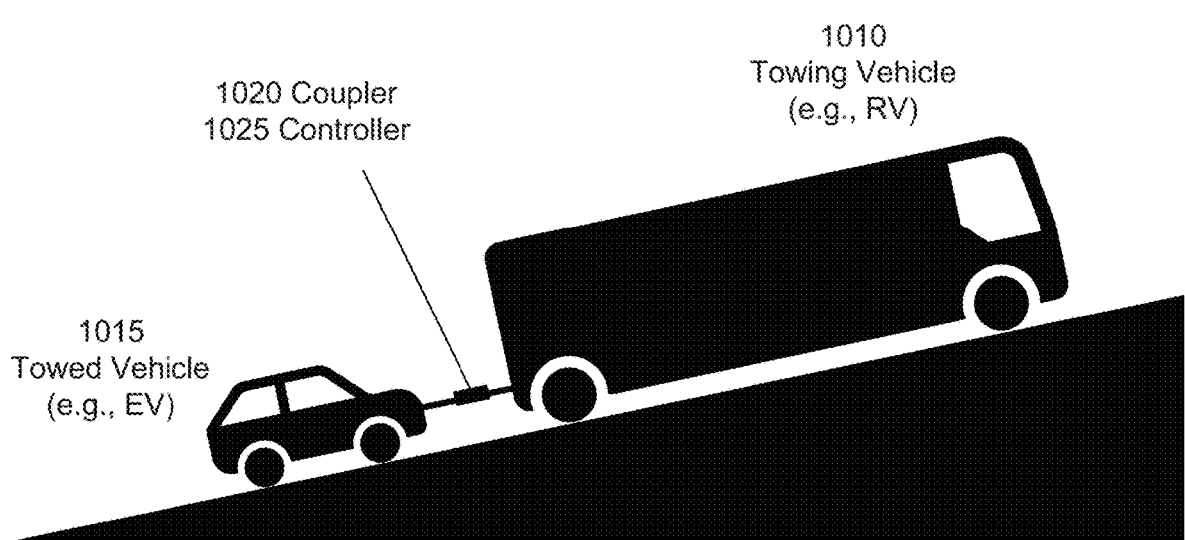
FIG. 10 depicts an illustrative diagram for towing electric vehicles, according to embodiments of the present disclosure.

In another exemplary embodiment of the present disclosure and with reference to FIG. 10, system 1000 includes towing vehicle 1010 coupled to towed vehicle 1015 via coupler 1020. As illustrated, towing vehicle 1010 is implemented as an RV and towed vehicle 1015 is implemented as an EV. RV 1010 tows EV 1015 uphill, i.e., on an incline. In such an embodiment, system 1000 activates the powertrain system of EV 1015 to assist the RV-EV's travel uphill.

In some embodiments, controller 1025 receives signal information from RV 1010 and/or EV 1015 and determines whether and to what extent the powertrain system of EV 1015 is to be activated. For example, controller 1025 receives throttle position and vehicle speed information from RV 1010. In such an example, controller 1025 determines that the vehicle speed of RV 1010 is slower than desired by, for example, determining that the throttle position increases over time while the vehicle speed of RV 1010 remains constant or decreases. Controller 1025 activates the powertrain system of EV 1015 to supplement the forward acceleration of RV 1010. In this way, system 1000 utilizes the powertrain system of EV 1015 to supplement the powertrain system of RV 1010 to increase the overall forward acceleration of the RV-EV 1010, 1015 combination. In some embodiments, such implementation is referred to as EV Assist.

Although the EV Assist mode is illustrated while the RV 1010 and EV 1015 are traveling on an incline, such EV Assist configuration can be implemented on any terrain, without departing from the contemplated embodiments. For example, in an embodiment where the RV 1010 tows EV 1015 on flat terrain and desires additional acceleration to, for example, pass another vehicle in the roadway, controller 1025 can implement EV Assist mode to add additional forward acceleration to RV 1010. Alternatively, system 1000 can engage in EV Assist mode in response to receiving a user selectable input at a user equipment.

Figure 11:
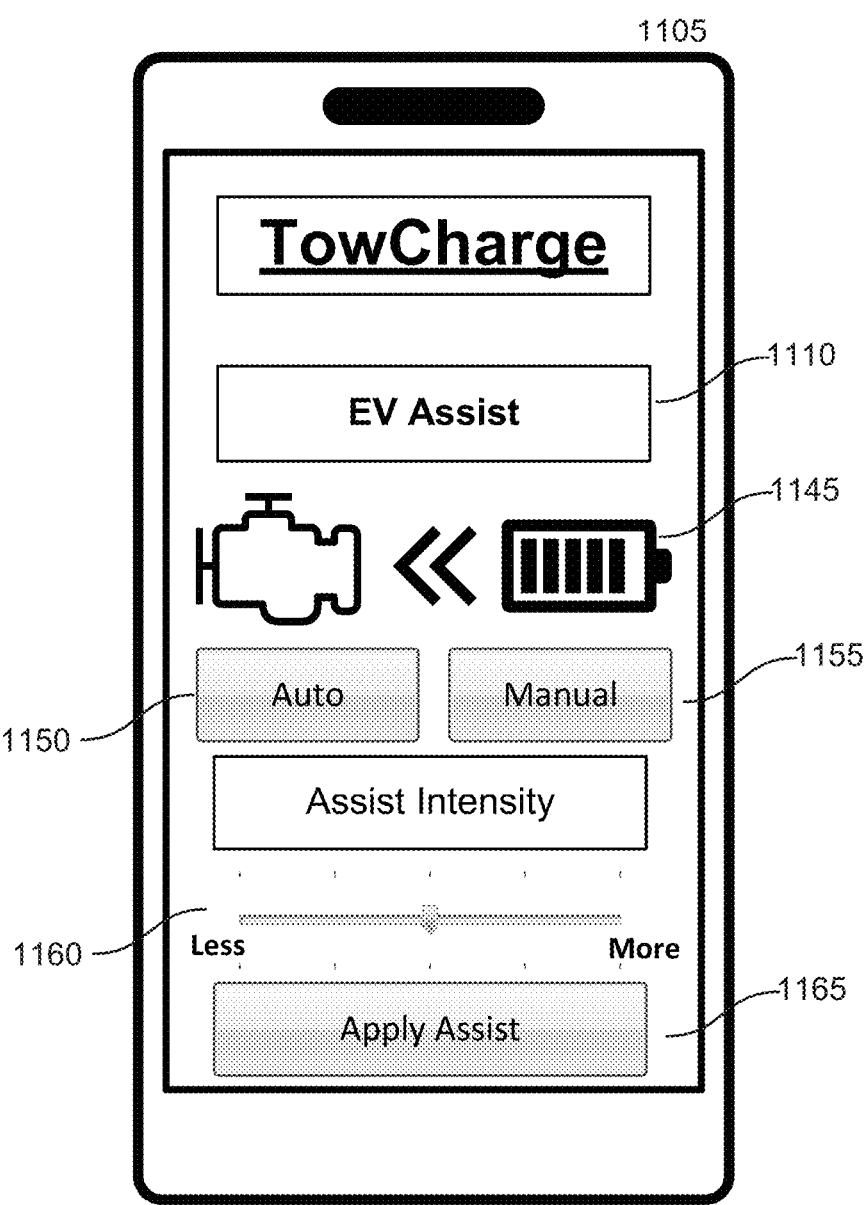
FIG. 11 depicts an illustrative user interface of a system for towing electric vehicles, according to embodiments of the present disclosure.

In another exemplary embodiment of the present disclosure and with reference to FIG. 11, system 1100 includes user equipment 1105. As illustrated, user equipment 1105 is implemented in EV Assist Mode. In such an embodiment, system 1100 is implemented in an environment where an RV-EV combination is traveling on an incline, for example, as discussed with respect to FIG. 10. In some embodiments, user equipment 1105 displays indicators, for example, charge mode indicator 1110 and charge indicator 1145. In some embodiments, user equipment 1105 also displays user selectable inputs 1150, 1155, and 1165, as well as assist level selector 1160.

In operation and as illustrated, user equipment 1105 is implemented in EV Assist mode, as indicated by mode indicator 1110. System 1100 determines whether the powertrain system of the EV should be activated based on traveling on an incline. For example, system 1100 activates the powertrain system of the EV to supplement the forward acceleration of the RV-EV combination by applying rotational acceleration to the wheels of the EV so as to maintain a constant speed (or increase forward acceleration) despite the RV-EV combination traveling on an incline.

In some embodiments, user selectable input 1165 may be selected to manually activate the EV's powertrain system. In such an embodiment, user selectable input 1160 may be manipulated to increase or decrease the assist intensity applied by the EVs powertrain system. In other embodiments, system 1100 automatically activates the powertrain system of the EV. Although indicators 1110, 1145, and user selectable inputs 1150, 1155, 1160, and 1165 are illustrated and described as being implemented on user equipment 1105 in a specific mode (as illustrated, EV Assist mode), such user selectable inputs and indicators can be used in any mode without departing from the contemplated embodiments.

Figure 12A:
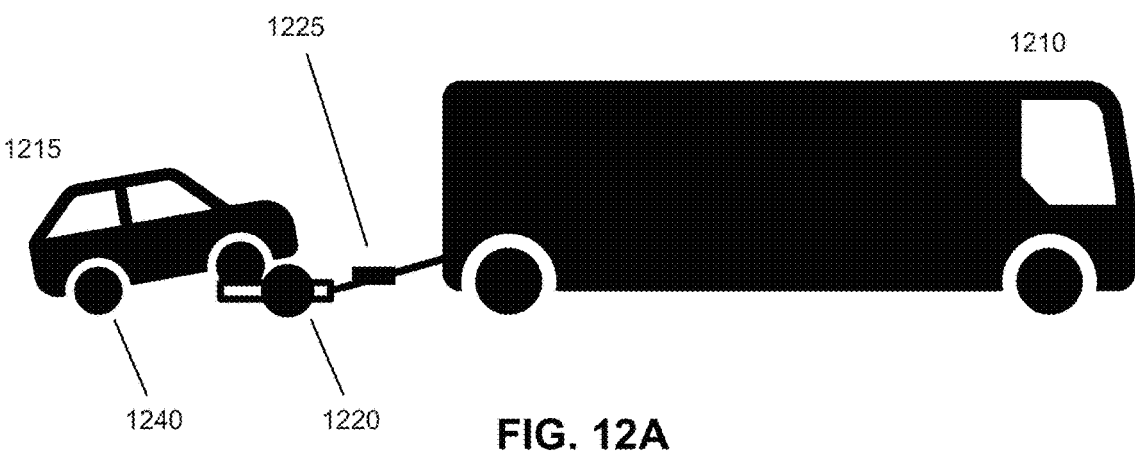
FIGS. 12A-12B depict illustrative diagrams for towing electric vehicles, according to embodiments of the present disclosure.
Figure 12B:
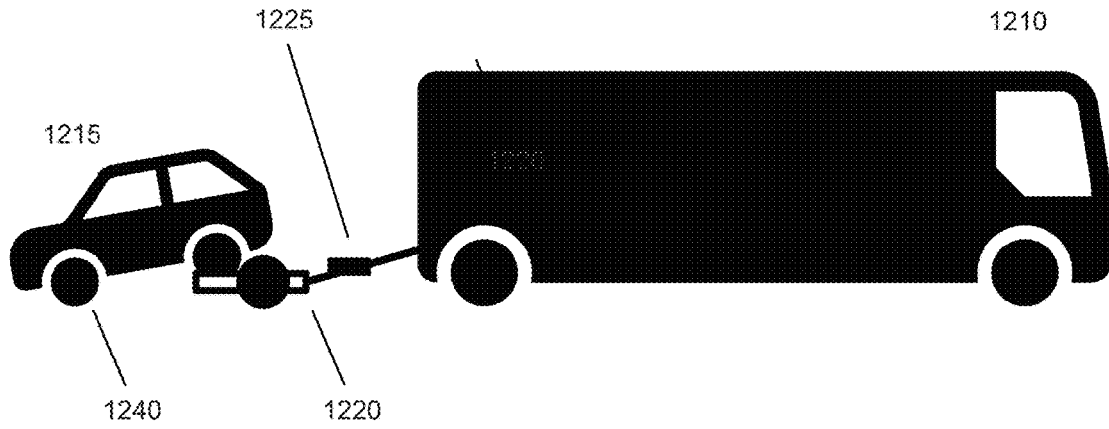

FIGS. 12A-12B illustrate exemplary embodiments of the present disclosure where coupler 1220 is implemented as a tow dolly. A tow dolly typically elevates two wheels of a towed vehicle off the ground. Tow dollies can be used with either the front wheels (as illustrated in FIG. 12A) or rear wheels (as illustrated in FIG. 12B) of the towed vehicle 1215. System 1200 further includes controller 1225 that implements the techniques discussed herein. Alternatively, controller 1225 is integrated into a user equipment, e.g., user equipment 105, 405, 605, 805, 1105, 1505, 1605.

Referring to FIG. 12A, dolly 1220 is implemented by elevating the front wheels of towed vehicle 1215. As illustrated, the rear wheels 1240 of towed vehicle 1215 remain in contact with the ground while vehicle 1215 is being towed. As illustrated, towed vehicle 1215 is embodied by an EV. EV's 1215 regenerative braking system is implemented at wheels 1240. In such an embodiment, system 1200 implements the techniques described herein, for example, accelerating (as discussed at step 210 in FIG. 2 and at step 302 in FIG. 3), decelerating (as discussed at step 212 in FIG. 2 and at step 316 in FIG. 3), coasting (as discussed at step 214 in FIG. 2 and at step 326 in FIG. 3), uphill (as discussed at step 216 in FIG. 2 and at step 330 in FIG. 3), downhill (as discussed at step 218 in FIG. 2 and at step 344 in FIG. 3), and stopped (as discussed at step 220 in FIG. 2 and at step 354 in FIG. 3).

Referring to FIG. 12B, dolly 1220 is implemented by elevating the rear wheels of towed vehicle 1215. As illustrated, the front wheels 1240 of towed vehicle 1215 remain in contact with the ground while vehicle 1215 is being towed. As illustrated, towed vehicle 1215 is embodied by an EV. EV's 1215 regenerative braking system is implemented at wheels 1240. In such an embodiment, system 1200 implements the techniques described herein, for example, accelerating (as discussed at step 210 in FIG. 2 and at step 302 in FIG. 3), decelerating (as discussed at step 212 in FIG. 2 and at step 316 in FIG. 3), coasting (as discussed at step 214 in FIG. 2 and at step 326 in FIG. 3), uphill (as discussed at step 216 in FIG. 2 and at step 330 in FIG. 3), downhill (as discussed at step 218 in FIG. 2 and at step 344 in FIG. 3), and stopped (as discussed at step 220 in FIG. 2 and at step 354 in FIG. 3).

In some embodiments, tow dolly 1220 includes a regenerative braking system applied at its wheels In such an embodiment, tow dolly 1220 may further include a battery to store electrical power generated by the regenerative braking system of tow dolly 1220. In some embodiments, the electrical power generated by tow dolly 1220 is transferred to EV 1215. In other embodiments, tow dolly includes the roller technique discussed with respect to FIG. 14.

Figure 13:
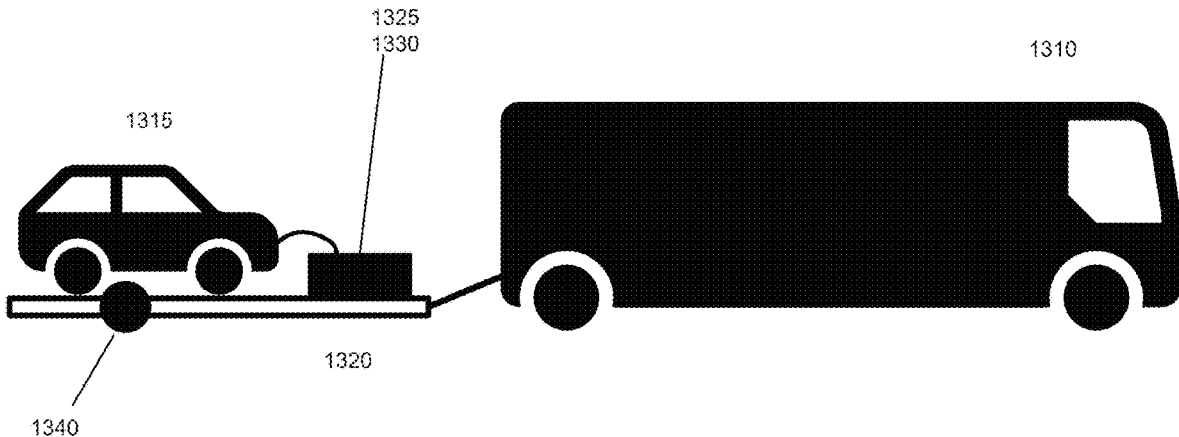
FIG. 13 depicts an illustrative diagram for towing electric vehicles, according to embodiments of the present disclosure.

In another exemplary embodiment of the present disclosure and with reference to FIG. 13, system 1300 includes towing vehicle 1310, towed vehicle 1315, and coupler 1320. As illustrated, towing vehicle 1310 is embodied by an RV, towed vehicle 1315 is embodied by an EV, and coupler 1320 is embedded by a trailer. In such an embodiment, EV 1315 is towed on trailer 1320 and none of the EV's 1315 wheels are in contact with the ground.

In such an embodiment, system 1300 implements the techniques described herein, for example, accelerating (as discussed at step 210 in FIG. 2 and at step 302 in FIG. 3), decelerating (as discussed at step 212 in FIG. 2 and at step 316 in FIG. 3), coasting (as discussed at step 214 in FIG. 2 and at step 326 in FIG. 3), uphill (as discussed at step 216 in FIG. 2 and at step 330 in FIG. 3), downhill (as discussed at step 218 in FIG. 2 and at step 344 in FIG. 3), stopped (as discussed at step 220 in FIG. 2 and at step 354 in FIG. 3), and detecting and curing trailer wobble (as discussed with respect to FIG. 9).

In an embodiment, trailer 1320 includes a regenerative braking system implemented at wheels 1340. In such an embodiment, the trailer's 1340 regenerative braking system generates electrical power and is stored in battery 1330. In some embodiments, EV 1315 is connected to trailer 1320 and receives the electrical power generated by trailer's 1320 regenerative braking system.

In another embodiment, RV 1310 includes a regenerative braking system. In such an embodiment, the RV's regenerative braking system is used to generate electrical power that is stored in battery 1330 and/or transferred to EV 1315.

Figure 14:
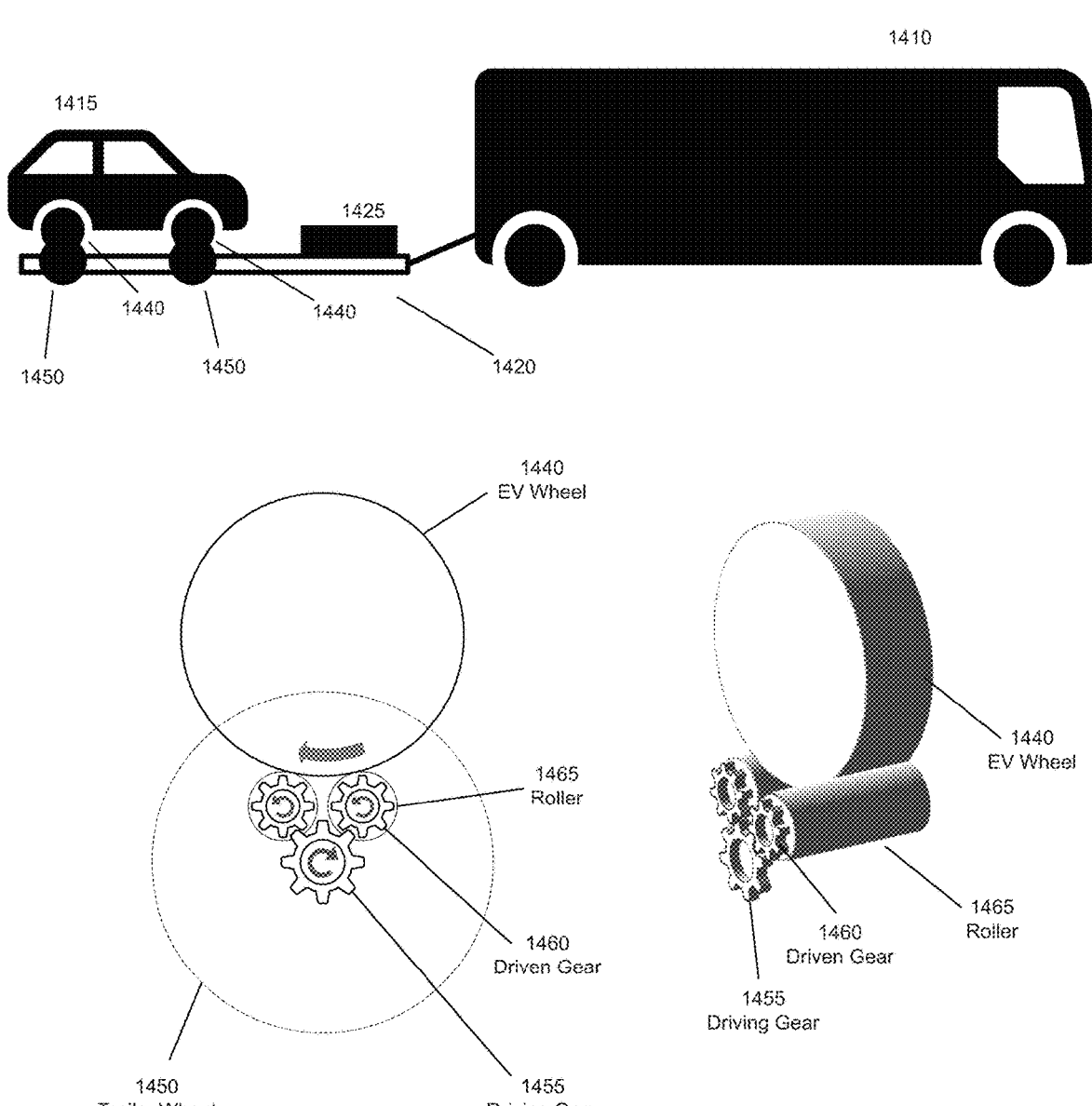
FIG. 14 depicts an illustrative diagram for towing electric vehicles, according to embodiments of the present disclosure.

In another exemplary embodiment of the present disclosure and with reference to FIG. 14, system 1400 includes towing vehicle 1410, towed vehicle 1415, and coupler 1420. In some embodiments, system 1400 includes controller 1425 and may further include an onboard battery, for example, located near controller 1425. As illustrated, towing vehicle 1410 is embodied by an RV, towed vehicle 1415 is embodied by an EV, and coupler 1420 is embodied by a trailer. In such an embodiment, EV 1415 is towed on trailer 1420 without any of the EV's 1415 wheels being in contact with the ground. Trailer 1420 includes trailer wheel 1450 that is connected to driving gear 1455 such that driving gear 1455 rotates as trailer wheel 1450 rotates. System 1400 further includes rollers 1465, each connected to driven gear 1460 such that rollers 1465 rotate when driven gears 1460 rotate. EV 1415 is orientated such that each of EV's 1415 wheels are placed on rollers 1465.

In the illustrated configuration, trailer wheel 1450 rotates by virtue of its contact with the ground while being towed, which causes driving gear 1455 to rotate. Driving gear 1455, in turn, causes driven gears 1460 to rotate, which cause rollers 1465 to rotate, which causes EV wheel 1440 to rotate. In this way, the rotational movement of the trailer wheel 1450 causes EV wheel 1440 to rotate, thereby allowing the EV's 1415 regenerative braking system to charge the EV's 1415 battery while being towed.

Although a single trailer wheel 1450, a single driving gear 1455, two driven gears 1465, and a single EV wheel 1440 are illustrated and described in the illustrated detail view of FIG. 14, any number of trailer wheels 1450, driving gears 1455, driven gears 1465, and EV wheels 1440 can be implemented without departing from the contemplated embodiments. Additionally, although trailer 1420 is illustrated as having two sets of trailer wheel-roller combinations, any number of trailer wheel-roller combinations can be implemented (including zero) without departing from the contemplated embodiments. In some embodiments, trailer 1420 is open (i.e., uncovered) and in other embodiments, trailer 1420 is enclosed. Rollers 1460 may optionally include knurling or other features to increase the friction between rollers 1465 and EV wheel 1440. In some embodiments, system 1400 includes a mechanism that interrupts the rotational movement of the trailer wheel 1450 from the EV wheel 1440. For example, a clutch or other mechanism is implemented that disconnects trailer wheel 1450 from driving gear 1455. Alternatively, a clutch or other mechanism is implemented that disconnects driving gear 1455 from driven gear 1460. Alternatively, a clutch or other mechanism is implemented that disconnects driven gear 1460 from roller 1465. In another embodiments, the engagement between driving gear 1455 and driven gear 1460 can be removed, thereby interrupting the rotational movement between trailer wheel 1450 and EV wheel 1440. In some embodiments, such interruption in rotational movement is implemented as a result of user input while in other embodiments, it is implemented automatically (e.g., by system 1400).

Figure 15:
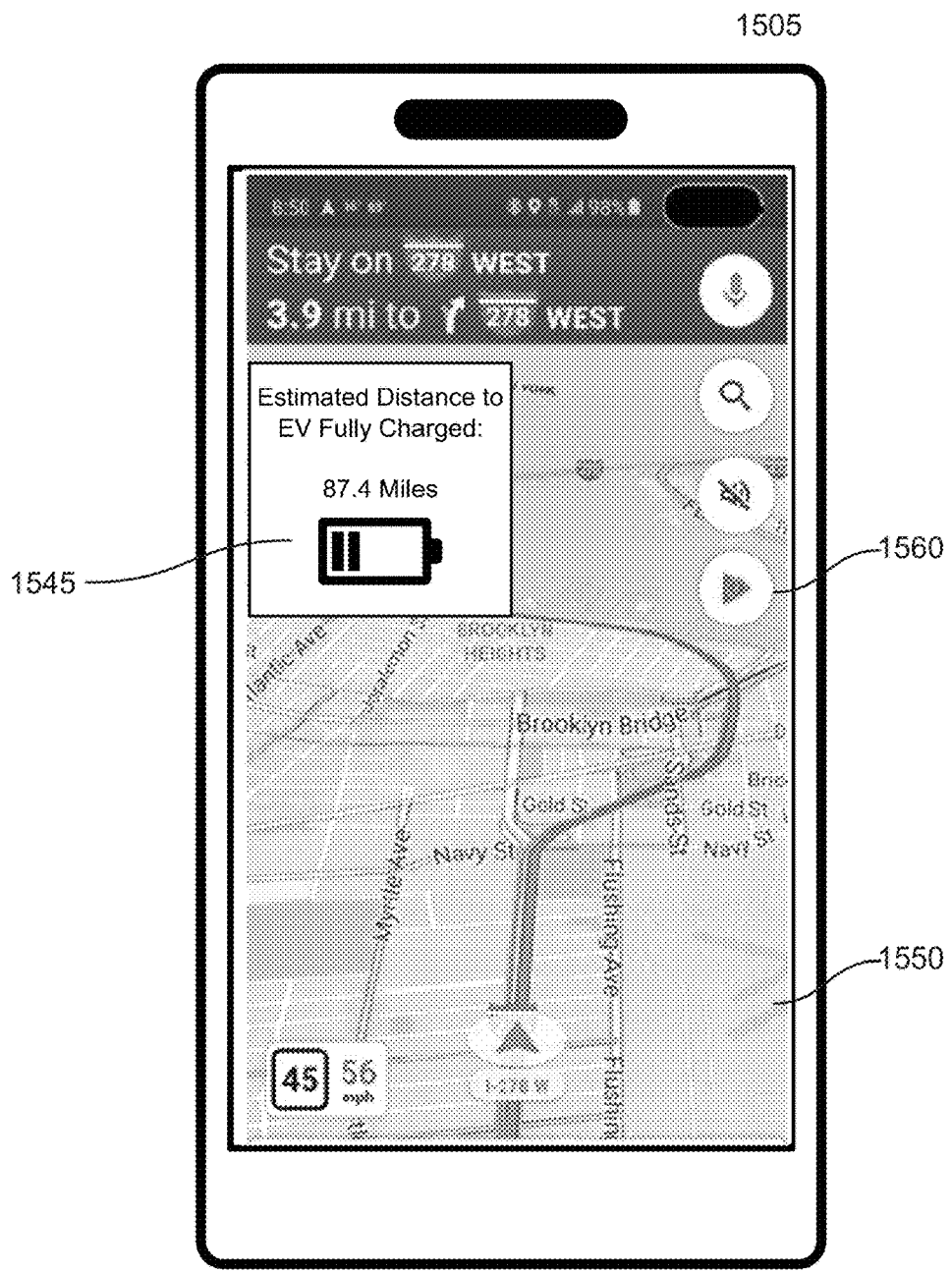
FIG. 15 depicts an illustrative user interface of a system for towing electric vehicles, according to embodiments of the present disclosure.

In another exemplary embodiment of the present disclosure and with reference to FIG. 15, system 1500 includes user equipment 1505. As illustrated, user equipment 1505 displays navigation mapping application 1550 and charge indicator 1545. In an embodiment, user equipment 1505 interfaces with a regenerative braking system of an EV for example EV 115, 115a, 115b as discussed with FIG. 1; EV 715 as discussed with respect to FIG. 7; EV 915 as discussed with respect to FIG. 9; EV 1015 as discussed with respect to FIG. 10; EV 1240 as discussed with respect to FIG. 12, EV 1315 as discussed with respect to FIG. 13; EV 1415 as discussed with respect to FIG. 14. In some embodiments, system 1500 interfaces with an EV via a controller, for example, controller 125 as discussed with respect to FIG. 1, controller 725 as discussed with respect to FIG. 7, controller 925 as discussed with respect to FIG. 9, controller 1025 as discussed with respect to FIG. 10, controller 1220 as discussed with respect to FIG. 12, controller 1325 as discussed with respect to FIG. 13, and controller 1425 as discussed with respect to FIG. 14.

In another exemplary embodiment of the present disclosure and with reference to FIG. 15, system 1500 includes user equipment 1505. User equipment 1505 displays charge indicator 1545 indicating the level of charge of the EV. Additionally, charge indicator 1545 displays the distance (e.g., estimated) that the EV is to be towed to reach a charge of 100%.

System 1500 considers various information relating to mapping application 1550, for example, the distance anticipated to be traveled, the types of roads that are to be travelled, the elevation gain and loss over the mapped route, traffic information (historical, presently identified, and anticipated future traffic), speed limitations, toll information, route limitations (e.g., size, weight, turning radius, speed, and incline/decline limitations), waypoints, and points of interest.

In some embodiments, system 1500 utilizes mapping data from mapping application 1550 to optimize engaging and disengaging the regenerative braking system of the EV based on the mapped route. In other embodiments, system 1500 interfaces with mapping application 1550 to select the route that optimizes the charging of a towed EV. In this way, mapping application 1550 is used to optimize the charging of a towed EV. In other embodiments, mapping application 1550 additionally includes user selectable inputs 1550.

In some embodiments, user selectable inputs 1560 are native to mapping application 1550. In other embodiments, user selectable inputs 1560 interface with the systems and methods described herein. For example, user selectable inputs 1560 may be embodied by user selectable inputs 420, 425, 430, and 435, as discussed with respect to FIG. 4; user selectable input 660 as discussed with respect to FIG. 6; user selectable input 850, 855, 860, and 865 as discussed with respect to FIG. 8; user selectable input 950, 955 as discussed with respect to FIG. 9; and user selectable input 1150, 1155, 1160, and 1165 as discussed with respect to FIG. 11.

Figure 16:
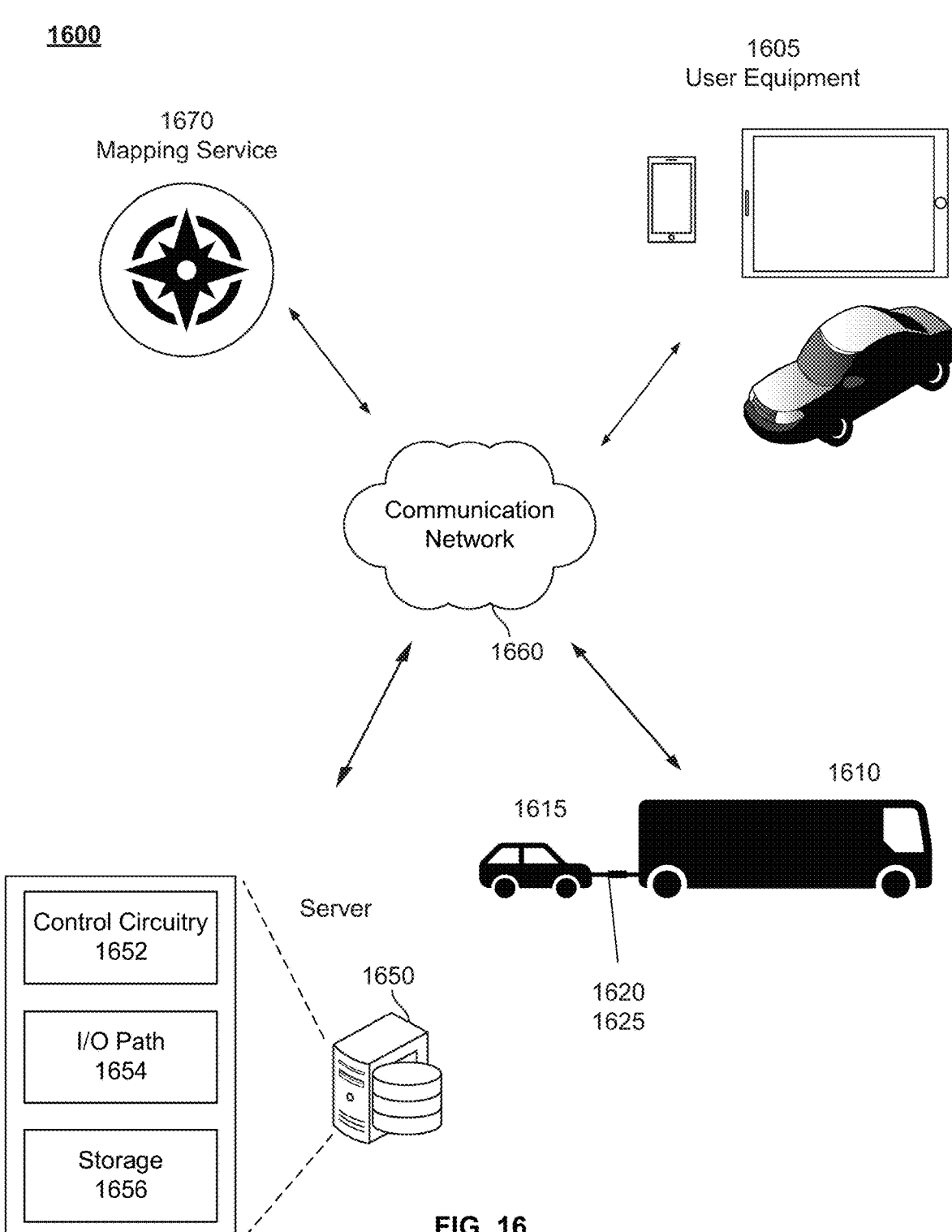
FIG. 16 depicts an illustrative diagram for towing electric vehicles, according to embodiments of the present disclosure.

FIG. 16 illustrates an exemplary embodiment of the present disclosure where system 1600 includes and/or considers mapping information, for example, as discussed with respect to FIG. 15. System 1600 includes user equipment 1605, mapping service 1670, server 1650, which are able to communicate with one another using communication network 1660. In some embodiments, server 1650 includes control circuitry 1652, input/output (IO) path 1654, and storage 1656. FIG. 16 illustrates generalized embodiments of an illustrative device, e.g., user equipment 105, 405, 605, 805, 1105, 1505, 1605 and controller 125, 725, 925, 1025, 1225, 1325, 1425, 1625. For example, user equipment 1605 may be a smartphone device, a tablet, a computer, or a remote control, such as illustrative user equipment 1605. In other embodiments, user equipment 1605 is navigational equipment installed or included in a vehicle. In some embodiments, server 1650 may include one or more circuit boards. In some embodiments, the circuit boards may include control circuitry (e.g., control circuitry 1652) and storage (e.g., RAM, ROM, Hard Disk, Removable Disk, etc.) (e.g., storage 1656). In some embodiments, circuit boards may include an input/output path (e.g., I/O Path 1654). In some embodiments, user equipment 1605 may receive content and data via input/output (hereinafter "I/O") path 1654. I/O path 1654 may provide content (e.g., mapping data/information available over a local area network (LAN) or wide area network (WAN), and/or other content) and data to control circuitry 1652 and storage 1656. Control circuitry 1652 may be used to send and receive commands, requests, and other suitable data using I/O path 1654. I/O path 1654 may connect control circuitry 1652 to one or more communications paths (described herein). I/O functions may be provided by one or more of these communications paths but are shown as a single path in FIG. 16 to avoid over-complicating the drawing.

Control circuitry 1652 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate units, for example, multiple of the same type of processing units (e.g., two Intel Core i7 processors) or multiple different processors (e.g., an Intel Core i5 processor and an Intel Core i7 processor). In some embodiments, control circuitry 1652 executes instructions for an application stored in memory (e.g., storage 1656). Specifically, control circuitry 1652 may be instructed by the application to perform the functions discussed herein. For example, the application may provide instructions to control circuitry 1652 to generate navigational information or other information related to the towing vehicle, towed vehicle, controller, or other device described herein. In some implementations, any action performed by control circuitry 1652 may be based on instructions received from the application.

In client server-based embodiments, control circuitry 1652 may include communications circuitry suitable for communicating with a user equipment (e.g., user equipment 1605) or other networks or servers. The instructions for carrying out the functionality discussed herein may be stored on the server (e.g., server 1650). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry (e.g., I/O Path 1654). Such communications may involve the Internet or any other suitable communications networks or paths (e.g., I/O Path 1654). In addition, communications circuitry may include circuitry that enables peer-to-peer communication of user equipment devices, or communication of user equipment devices in locations remote from each other (described in more detail herein).

Memory may be an electronic storage device provided as storage 1656 that is part of control circuitry 1652. As referred to herein, the phrase "electronic storage device" or "storage device" should be understood to mean any device for storing electronic data, computer software, or firmware, such as random-access memory, read-only memory, hard drives, non-transitory computer readable medium, or any other suitable fixed or removable storage devices, and/or any combination of the same. Storage 1656 may be used to store various types of content, navigation data, and instructions for executing content access applications. Nonvolatile memory may also be used (e.g., to launch a boot-up routine and other instructions).

Control circuitry 1652 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1652 may also include scaler circuitry for upconverting and downconverting content into the preferred output format of the user equipment 1605. Circuitry 1652 may also include digital-to-analog converter circuitry and analog-to-digital converter circuitry for converting between digital and analog signals. The tuning and encoding circuitry may also be used to receive guidance data. The circuitry described herein, including for example, the tuning, video-generating, encoding, decoding, encrypting, decrypting, scaler, navigating, and analog/digital circuitry, may be implemented using software running on one or more general purpose or specialized processors. If storage 1656 is provided as a separate device from user equipment 1605, the charging, mapping, and encoding circuitry may be associated with storage 1656.

A user may send instructions to control circuitry 1652 using a user input interface (e.g., user interface illustrated and described with user equipment 105, 405, 605, 805, 1105, 1505, 1605) that is part of user equipment (e.g., user equipment 1605). User input interface may be any suitable user interface, such as a remote control, mouse, trackball, keypad, keyboard, touchscreen, touchpad, stylus input, joystick, voice recognition interface, or other user input interfaces. The user interface may be provided as a stand-alone device or integrated with other elements of each one of user equipment 1605 and system 1600. For example, user interface used with user equipment 105, 405, 605, 805, 1105, 1505, 1605 may be a touchscreen or touch-sensitive display. In such circumstances, user equipment 1605 may be integrated with or combined with such user interface.

Mapping service 1670 may be implemented using any suitable architecture. For example, mapping service 1670 may be a stand-alone application wholly implemented on user equipment 1605. In such an approach, instructions for the application are stored locally (e.g., mapping database located at server 1650 or mapping service 1670), and data for use by the application is downloaded on a periodic basis (e.g., from an out-of-band feed, from an Internet resource, or using another suitable approach). Control circuitry at user equipment (e.g., 105, 405, 605, 805, 1105, 1505, 1605) retrieves instructions of the application from storage (e.g., a mapping database or storage 1656) and process the instructions to generate any of the displays discussed herein. Based on the processed instructions, control circuitry may determine what action to perform when input is received from input interface.

In an embodiment, user equipment 1605 communicates with controller 1625 to send and receive information related to towing vehicle 1610, towed vehicle 1615, coupler 1620, and controller 1625. Non limiting examples of information communicated to and from user equipment 1605 include towing information, charging information, coupler information, route information, and vehicle information. In embodiments where controller 1625 is implemented as a separate device, user equipment communicates where controller 1625 over communication network 1660.

In some embodiments, controller 1625 communicates with towing vehicle 1610, towing vehicle 1615, coupler 1620, and/or user equipment 1605 using communication network 1660. Additionally, user equipment 1605, towing vehicle 1610, towed vehicle 1615, coupler 1620, controller 1625, server 1650, and/or mapping service 1670 communicate with each other, over communication network 1660.

It is contemplated that some suitable steps or suitable descriptions of FIGS. 2, 3A, 3B, 5 may be used with other suitable embodiments of this disclosure. In addition, some suitable steps and descriptions described in relation to FIGS. 2, 3A, 3B, 5 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1, 4, 6-16 could be used to perform one or more of the steps in FIGS. 2, 3A, 3B, 5.

The processes discussed herein are intended to be illustrative and not limiting. For instance, the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving, at a controller, vehicle speed information relating to a first vehicle comprising a regenerative braking system;

receiving, at the controller, vehicle speed information relating to a second vehicle coupled to the first vehicle;

receiving, at the controller, throttle position information related to the second vehicle;

determining, based on (1) the vehicle speed information relating to the first vehicle, (2) the vehicle speed information relating to the second vehicle, and (3) the throttle position information related to the second vehicle, whether to engage the regenerative braking system of the first vehicle in a mode of a plurality of modes; and based on the determining, sending a regeneration signal to the first vehicle, wherein the regeneration signal causes the first vehicle to engage the regenerative braking system of the first vehicle in the mode of the plurality of modes;

wherein the regenerative braking system comprises a first wheel set of the first vehicle coupled to a motor-generator and a battery; and wherein the first vehicle is coupled to the second vehicle via a coupler.

2. The method of claim 1,
wherein the determining comprises:
comparing the vehicle speed information relating to the second vehicle to a deceleration threshold to determine whether a deceleration of the second vehicle exceeds the deceleration threshold;

wherein the mode is a power regeneration mode characterized by engaging the motor-generator to generate electricity that is stored by the battery; and wherein engaging the motor-generator to generate electricity causes a braking torque to be applied to the first wheel set.

3. The method of claim 1,
wherein the determining comprises:
comparing the vehicle speed information relating to the second vehicle to an acceleration threshold to determine whether an acceleration of the second vehicle exceeds the acceleration threshold;

wherein the mode is an assist mode characterized by engaging the motor-generator to generate rotational acceleration at the first wheel set of the first vehicle.

4. The method of claim 1, wherein the first vehicle is an electric vehicle, and the second vehicle is a recreational vehicle.

5. The method of claim 1, wherein the coupler is a tow bar, and wherein the tow bar is attached to a rear section of the second vehicle and a front section of the first vehicle.

6. The method of claim 1, wherein the coupler is a tow dolly, wherein the tow dolly is attached to a rear section of the second vehicle and lifts a second wheel set of the first vehicle off the ground while the first wheel set remains in contact with the ground.

7. The method of claim 1, wherein the coupler comprises a force sensor, and wherein the vehicle speed information relating to the second vehicle is based on force sensor information received from the force sensor.

8. The method of claim 1, further comprising:
receiving, from a user equipment device, a mode selection input;
wherein the determining is further based on the mode selection input.

9. The method of claim 8, further comprising:
receiving, from the user equipment device, route mapping information;
wherein the determining is further based on the route mapping information.

10. The method of claim 8, wherein the mode is a forced charging mode characterized by engaging the motor-generator to generate electricity that is stored by the battery; and wherein the mode selection input relates to the forced charging mode.

11. A method comprising:

receiving, at a first vehicle comprising a regenerative braking system, vehicle speed information relating to a second vehicle coupled to the first vehicle via a coupler;

receiving, at the first vehicle, throttle position information related to the second vehicle;

determining, based on the vehicle speed information relating to the second vehicle and the throttle position information related to the second vehicle, whether to engage the regenerative braking system of the first vehicle in a mode of a plurality of modes; and based on the determining, engaging the regenerative braking system of the first vehicle in the mode of the plurality of modes;

wherein the regenerative braking system comprises a first wheel set of the first vehicle coupled to a motor-generator and a battery.

12. The method of claim 11, wherein the determining comprises:

comparing the vehicle speed information relating to the second vehicle to a deceleration threshold to determine whether a deceleration of the second vehicle exceeds the deceleration threshold;

wherein the mode is a power regeneration mode characterized by engaging the motor-generator to generate electricity that is stored by the battery; and wherein engaging the motor-generator to generate electricity causes a braking torque to be applied to the first wheel set.

13. The method of claim 11, wherein the determining comprises:

comparing the vehicle speed information relating to the second vehicle to an acceleration threshold to determine whether an acceleration of the second vehicle exceeds the acceleration threshold;

wherein the mode is an assist mode characterized by engaging the motor-generator to generate rotational acceleration at the first wheel set of the first vehicle.

14. The method of claim 11, wherein the first vehicle is an electric vehicle, and the second vehicle is a recreational vehicle.

15. The method of claim 11, wherein the coupler comprises a force sensor, and wherein the vehicle speed information relating to the second vehicle is based on force sensor information received from the force sensor.

16. A system comprising:

a memory configured to store non-transitory computer readable instructions to engage and disengage a regenerative braking system of a first vehicle;

input/output circuitry configured to:

receive vehicle speed information relating to the first vehicle;

receive vehicle speed information relating to a second vehicle;

receive throttle position information related to the second vehicle; and send a regeneration signal to the first vehicle, wherein the regeneration signal causes the first vehicle to engage the regenerative braking system of the first vehicle in a mode of a plurality of modes; and control circuitry configured to:

determine, based on (1) the vehicle speed information relating to the first vehicle, (2) the vehicle speed information relating to the second vehicle, and (3) the throttle position information related to the second vehicle, whether to engage the regenerative braking system of the first vehicle in the mode of the plurality of modes;

wherein the regenerative braking system comprises a first wheel set of the first vehicle, a motor-generator, and a battery; and wherein the first vehicle is coupled to the second vehicle via a coupler.

17. The system of claim 16, wherein the determining comprises:

comparing the vehicle speed information relating to the second vehicle to a deceleration threshold to determine whether a deceleration of the second vehicle exceeds the deceleration threshold;

wherein the mode is a power regeneration mode characterized by engaging the motor-generator to generate electricity that is stored by the battery; and wherein engaging the motor-generator to generate electricity causes a braking torque to be applied to the first wheel set.

18. The system of claim 16, wherein the determining comprises:

comparing the vehicle speed information relating to the second vehicle to an acceleration threshold to determine whether an acceleration of the second vehicle exceeds the acceleration threshold;

wherein the mode is an assist mode characterized by engaging the motor-generator to generate rotational acceleration at the wheel set of the first vehicle.

19. The system of claim 16, wherein the first vehicle is an electric vehicle, and the second vehicle is a recreational vehicle.

20. The system of claim 16, wherein the coupler is a tow bar, and wherein the tow bar is attached to a rear section of the second vehicle and a front section of the first vehicle.

* * * * *